United States Patent
Totani et al.

(10) Patent No.: US 9,728,960 B2
(45) Date of Patent: Aug. 8, 2017

(54) MULTIMODE DISTRIBUTION SYSTEMS AND METHODS FOR PROVIDING POWER FROM POWER SOURCES TO POWER CONSUMING DEVICES

(71) Applicant: Yahoo! Inc., Sunnyvale, CA (US)

(72) Inventors: Mozan Totani, San Jose, CA (US); Jesus Lalo Suarez, Fremont, CA (US); Barry C. Bianculli, Los Banos, CA (US); Thomas Trevino, San Jose, CA (US); Bob Lytle, Saratoga, CA (US); Norman Holt, Oakley, CA (US)

(73) Assignee: Excalibur IP, LLC, New York, NY (US)

( * ) Notice: Subject to any disclaimer, the term of this patent is extended or adjusted under 35 U.S.C. 154(b) by 6 days.

(21) Appl. No.: 14/839,819

(22) Filed: Aug. 28, 2015

(65) Prior Publication Data

US 2015/0372486 A1  Dec. 24, 2015

Related U.S. Application Data

(63) Continuation of application No. 13/648,179, filed on Oct. 9, 2012, now Pat. No. 9,136,707.

(51) Int. Cl.
*H02J 3/00* (2006.01)
*H02J 3/38* (2006.01)
*H02J 9/06* (2006.01)

(52) U.S. Cl.
CPC .............. *H02J 3/005* (2013.01); *H02J 3/381* (2013.01); *H02J 9/062* (2013.01); *Y10T 307/391* (2015.04)

(58) Field of Classification Search
CPC ......... Y10T 307/391; H02J 3/00; H02J 3/381; H02J 3/005; H02J 3/006; H02J 9/04
USPC .............................................. 307/29, 38, 39
See application file for complete search history.

(56) References Cited

U.S. PATENT DOCUMENTS

| | | | |
|---|---|---|---|
| 8,330,297 B2 | 12/2012 | Pines | |
| 2005/0177756 A1 | 8/2005 | Dobbs | |
| 2010/0090540 A1* | 4/2010 | Tanaka | G01R 31/3658 307/115 |
| 2010/0156187 A1 | 6/2010 | Pines | |

(Continued)

FOREIGN PATENT DOCUMENTS

WO  2007015242 A1  2/2007

*Primary Examiner* — Rexford Barnie
*Assistant Examiner* — Terrence Willoughby
(74) *Attorney, Agent, or Firm* — Martine Penilla Group, LLP

(57) ABSTRACT

Multimode distribution systems and methods are described. A multimode distribution system includes a first source interface for coupling to a first power source, a second source interface for coupling to a second power source, and a first selection device to be coupled via a first connection matrix and the first source interface with the first power source to provide main power to one or more power consumption devices. The multimode distribution system includes a second selection device to be coupled via a second connection matrix and the first source interface with the first power source to provide main power to one or more additional power consumption devices. The second selection device is to be coupled via the second connection matrix and the second source interface with the second power source to provide alternative power to the additional power consumption devices.

17 Claims, 17 Drawing Sheets

(56) References Cited

U.S. PATENT DOCUMENTS

2011/0278932 A1* 11/2011 Navarro .................. H02J 9/062
 307/66
2013/0175867 A1 7/2013 Park
2014/0097680 A1* 4/2014 Navarro .................... H02J 9/06
 307/23

* cited by examiner

MULTIMODE DISTRIBUTION SYSTEMS AND METHODS FOR PROVIDING POWER FROM POWER SOURCES TO POWER CONSUMING DEVICES

CLAIM OF PRIORITY

This patent application is a continuation of and claims priority to and the benefit, under 35 U.S.C. §120, of co-pending patent application Ser. No. 13/648,179, filed on Oct. 9, 2012, titled "MULTIMODE DISTRIBUTION SYSTEMS AND METHODS FOR PROVIDING POWER FROM POWER SOURCES TO POWER CONSUMING DEVICES", which is incorporated by reference herein in its entirety for all purposes.

TECHNICAL FIELD

The present disclosure relates generally to a multimode distribution systems and methods for providing power from power sources to power consuming devices.

BACKGROUND

A data center is a facility that holds telecommunication equipment, e.g., computers, servers, telecommunication devices, storage systems, security devices, and power supplies. A data center can occupy a room, a floor, or even an entire building. Usually, most of the equipment in a data center includes servers that are placed in racks. People can access the servers between the racks. In the data center, there is a supply of power from various power sources to the telecommunication equipment. However, it is costly to obtain the power sources to support the data center.

It is in this context that various embodiments of the present invention arise.

SUMMARY

The following detailed description together with the accompanying drawings will provide a better understanding of the nature and advantages of various embodiments of the present invention.

In an embodiment, a multimode distribution system in which a matrix allows coupling of one or more power sources to a power consumption device system and another matrix that allows coupling of different one or more power sources with another power consumption device system is described. By using different or same matrices to allow different power consumption device systems to couple with different power sources within a multimode distribution system provides flexibility of coupling a variety of power consumption device systems with a variety of power sources. For example, when a first power source and a first power consumption device system are obtained, the first power source is coupled to the first power consumption device system via a first matrix of a multimode distribution box. In this example, when a second power source and a second power consumption device system are obtained, the second power consumption device system is coupled to the first power source or the second power source via a second matrix of the multimode distribution box. Further, in this example, the second power consumption device system is coupled to the second power source when there is a failure in the first power source, e.g., the first power source malfunctions or is unoperational.

In one embodiment, a multimode distribution system includes a first source interface for coupling to a first power source, a second source interface for coupling to a second power source, and a first selection device to be coupled via a first connection matrix and the first source interface with the first power source to provide main power to one or more power consumption devices. The power consumption devices are operable to receive the main power from the first power source. The multimode distribution system includes a second selection device to be coupled via a second connection matrix and the first source interface with the first power source to provide main power to one or more additional power consumption devices. The second selection device is to be coupled via the second connection matrix and the second source interface with the second power source to provide alternative power to the additional power consumption devices. The additional power consumption devices are operable to receive the main power from the first power source or the alternative power from the second power source.

In some embodiments, the additional power consumption devices are operable to receive the alternative power from the second power source while the power consumption devices are operable to receive the main power from the first power source.

In an embodiment, a system for providing power from a plurality of power sources to a plurality of power consuming devices is described. The system includes a first power source, a second power source being an alternative to the first power source, and a plurality of power consumption devices for receiving power from the first power source or the second power source. The system further includes a housing enclosing a first source interface, a second source interface, a first connection matrix, a second connection matrix, a first selection device, and a second selection device. The first selection device is to be coupled via the first connection matrix and the first source interface with the first power source to provide power to one or more power consumption devices. The power consumption devices are operable to receive power from the first power source. The second selection device is to be coupled via the second connection matrix and the first source interface with the first power source to provide power to one or more additional power consumption devices. The second selection device is also to be coupled via the second connection matrix and the second source interface with the second power source to provide alternative power to the additional power consumption devices. The additional power consumption devices are operable to receive the power from the first power source or the alternative power from the second power source.

In one embodiment, a method for providing power from a plurality of power sources to a plurality of power consuming devices is described. The method includes receiving main power via a first source interface from a first power source, receiving alternative power via a second source interface from a second power source, and receiving a selection to couple the first power source via the first source interface to one or more power consumption devices. The method further includes providing the main power received via the first source interface to the power consumption devices in response to receiving the selection. The power consumption devices are operable to receive the main power from the first power source. The method includes receiving a selection to couple the first power source via the first source interface to one or more additional power consumption devices or a selection to couple the second power source via the second source interface to the additional power consumption devices. The additional power consumption devices are operable to receive the main power from the first power source or alternative power from the second power source. The method includes providing the power received via the first source interface to the additional power consumption devices in response to receiving the selection to couple the first power source via the first source interface to the additional power consumption devices. The method includes providing the power received via the second source interface to the additional power consumption devices in response to receiving the selection to couple the second power source via the second source interface to the additional power consumption devices.

In an embodiment, a method is described. The method includes providing a multimode distribution system. The multimode distribution system includes a first connection matrix coupled to a first selection device and a second connection matrix coupled to a second selection device. The method further includes coupling the first connection matrix via a first source interface to a main power source, coupling the first selection device via a power distribution unit to a first power consumption device, and coupling the second selection device via a power distribution unit to a second power consumption device. The method includes coupling the second connection matrix via the first source interface with the main power source or coupling the second connection matrix via a second source interface with an alternative power source. The first connection matrix lacks a connection to couple the alternative power source to the first power consumption device.

DETAILED DESCRIPTION

The following example embodiments and their aspects are described and illustrated in conjunction with apparatuses, methods, and systems which are meant to be illustrative examples, not limiting in scope.

Figure 1:
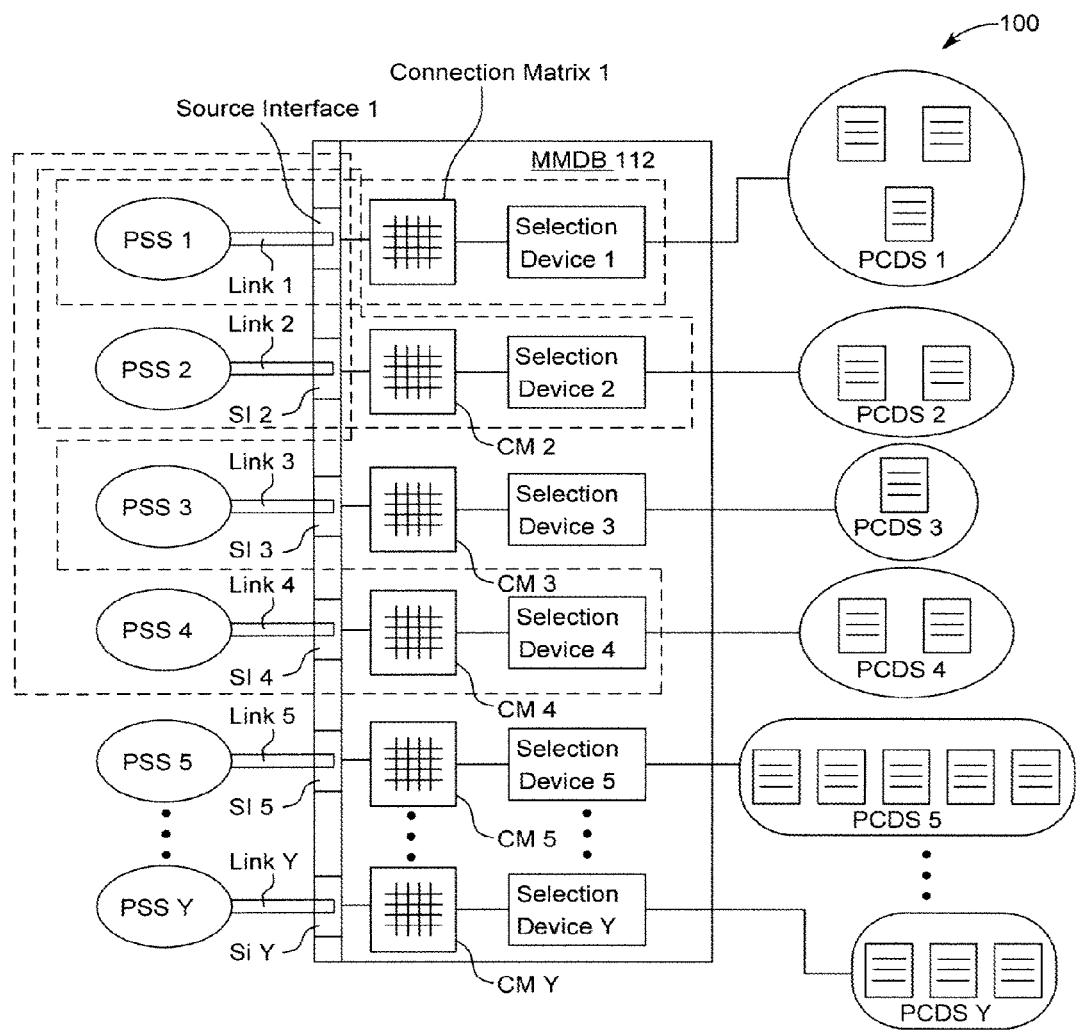
FIG. 1 is a block diagram of a system for providing power from power source systems to power consumption device systems (PCDSs), in accordance with one embodiment of the present invention.

FIG. 1 is a block diagram of an embodiment of a system 100 for providing power from power source systems (PSSs) 1 thru Y to power consumption device systems (PCDSs) 1 thru Y, where Y is an integer greater than zero. A PSS includes one or more power sources. Examples of a power source include an uninterruptible power supply (UPS), a main power supply, any number of utility power supplies, and a generator. A PSS may be a generator farm or an UPS farm. An example of a UPS farm includes battery or rotary power storage.

Each PCDS includes one more power consumption devices (PCDs). For example, a PCDS includes a rack of servers and/or networking equipment. Examples of a power consumption device include a server (e.g., an email server, a proxy server, a domain name system (DNS) server, a file server, an application server, a firewall, a virtual private network (VPN) gateway, an intrusion detection system), a networking equipment (e.g., a router, a repeater, a switch, a hub), a mainframe computer, and a storage device. A storage device includes a random access memory (RAM), a read-only memory (ROM), or a combination thereof. Examples of a storage device include a flash memory, a redundant array of independent disks, a hard disk, or a combination thereof.

In an embodiment, each PCDS includes 200 kilowatts of load. In one embodiment, each PCDS includes a load ranging between 5 kilowatts and 5 megawatts.

A PSS is coupled to a source interface (SI) via a connection link. For example, the PSS Y is connected to a source interface Y via a connection link Y. In one embodiment, a connection link includes three phase lines for supplying three signals at three different phases, a ground line for conducting a ground signal, and a neutral line for receiving a signal in case of the three phase lines supply the three signals to an unbalanced load. In an embodiment in which the three phase lines supply the three signals to a balanced load, a connection link includes three phase lines for supplying three signals at three different phases and includes a ground line.

The source interface Y includes one or more electric circuit components to facilitate transfer of a signal via a connection matrix (CM) Y to provide compatibility with the PCDS Y that is coupled with the source interface Y. For example, the source interface Y includes one or more transformers, one or more electric switches, one or more circuit breakers, one or more inverters, or a combination thereof, to facilitate a conversion of power. As an example, power received via the connection link 1 is converted from a first voltage level to a second voltage level. The second voltage level is compatible with PCDS 1.

In an embodiment, a voltage level is compatible with a PCDS when the voltage level does not exceed that mentioned on each PCD of the PCDS. In one embodiment, a voltage level is compatible with a PCDS when the voltage is an alternating current (AC) voltage and each PCD of the PCDS operates based on the AC voltage. In one embodiment, a voltage level is compatible with a PCDS when the voltage is a DC voltage and each PCD of the PCDS operates based on the DC voltage. In this embodiment, the PCDs of the PCDS cannot operate based on an AC voltage.

In an embodiment, each PCD of a PCDS is designed to operate on a level of power that is different than a level of power that is used to operate each PCD of another PCDS. For example, each PCD of the PCDS 1 is designed or labeled to operate on a higher level of power than a level of power of operation for which each PCD of PCDS 2 is designed or labeled to operate. It should be noted that a voltage labeled on a PCD is a peak-to-peak voltage, a maximum voltage, an average voltage, a root mean square (RMS) voltage, etc. As another example, each PCD of a PCDS is designed to operate on a type, e.g. AC or DC, of power that is different than a type of power that is used to operate each PCD of another PCDS. For example, each PCD of the PCDS 1 is designed to operate on an AC power and each PCD of the PCDS 2 is designed to operate on a DC power.

In one embodiment, each source interface has a different function and/or structure compared to another source interface. For example, when the source interface 1 is coupled to a main power supply and the PCDS 1 is compatible with an AC voltage, the source interface 1 lacks an inverter that converts AC voltage to a DC voltage. As another example, when the source interface 4 is coupled to an UPS (e.g., a battery) and the PCDS 4 is compatible with an AC voltage, the source interface 1 includes an inverter that converts a DC voltage to an AC voltage. As yet another example, when the PCDS 1 is compatible with a higher voltage than PCDS 2, the source interface 1 includes a transformer that converts a voltage provided by the power supply 1 to the higher voltage and the source interface 2 includes a transformer that converts a voltage provided by the power supply 2 to the lower voltage that is compatible with each PCD of the PCDS 2.

A source interface is coupled with a connection matrix. For example, the source interface Y is coupled with the connection matrix Y. A connection matrix includes multiple connection lines and multiple connections. One connection line of a connection matrix may be coupled with another connection line of the connection matrix via a connection. For example, a vertical connection line of the connection matrix Y is coupled with a horizontal connection line of the connection matrix Y at a connection. As another example, a first phase line of a first connection line is coupled to a first phase line of a second connection line at a point of connection, a second phase line of the first connection line is coupled with a second phase line of the second connection line at a point of connection, a third phase line of the first connection line is coupled with a third phase line of the second connection line at a point of connection, a ground line of the first connection line is coupled with a ground line of the second connection line at a point of connection, and a neutral line of the first connection line is coupled with a neutral line of the second connection line at a point of connection.

Each connection line of the connection matrix Y has the same structure as that of the connection link Y that is coupled with the connection matrix Y via the source interface Y. For example, a connection line includes three phase lines, a ground line, and a neutral line. In an embodiment in which the three phase lines supply the three signals to a balanced load, a connection line includes three phase lines and a ground line.

In one embodiment, each connection line of the connection matrix Y has a different structure as that of the connection link Y that is coupled with the connection matrix Y via the source interface Y. For example, each connection line of the connection matrix Y includes three phase lines, a ground line, and a neutral line and the connection link Y includes three phase lines and a ground line.

A selection device Y is coupled with the connection matrix Y. Examples of a selection device include a multiplexer, multiple conductive lines coupled to a conductive line via multiple hardwired connections, and multiple conductive lines coupled to a conductive line via multiple switches or multiple circuit breakers. In one embodiment, the selection device Y includes one or more electric circuit components to couple the connection matrix Y with a select of the selection device Y. The selection device Y is coupled via a power distribution unit (PDU) to the PCDS Y.

It should be noted that a communication matrix is coupled to one or more PSSs via one or more corresponding source interfaces and one or more corresponding connection links. For example, the connection matrix 1 is coupled to the PSS 1 via the connection link 1 and the source interface 1. The connection matrix 1 lacks connection with any of the remaining PSSs 2 thru Y. As another example, the connection matrix 2 is coupled to the PSS 1 via the connection link 1 and the source interface 1 and is coupled to the PSS 2 via the connection link 2 and the source interface 2. The connection matrix 2 lacks connection with the PSSs 3 thru Y. As yet another example, the connection matrix 4 is coupled to the PSS 1 via the connection link 1 and the source interface 1, is coupled to the PSS 2 via the connection link 2 and the source interface 2, and is coupled to the PSS 4 via the connection link 4 and the source interface 4. The connection matrix 4 lacks connection with the PSS 3 and PSSs 5 thru Y.

It should be noted that in one embodiment, none of the connection matrices 1 thru Y are coupled with all the PSSs 1 thru Y. For example, the connection matrix 1 lacks connection with the PSSs 2 thru Y and the connection matrix 2 lacks connection with the PSSs 3 thru Y.

The PSS 1 supplies power, e.g., main power, via a connection link 1 to the source interface 1. The source interface 1 converts the power received from the PSS 1 to power that is compatible with the PCDS 1 and provides power to the connection matrix 1. The connection matrix 1 routes power received via the source interface 1 to the selection device 1. The selection device 1 facilitates communication of power received via the connection matrix 1 to the PCDS 1.

Examples of main power include power that is generated and supplied by an utility power source, which may be an AC or a DC electric power supply. Other examples of main power include power supplied by a power line, city power, street power, and grid power.

Moreover, the PSS 1 supplies main power via the connection link 1 and the source interface 1 to the connection matrix 2. The connection matrix 2 routes main power received via the source interface 1 to the selection device 2. The selection device 2 selects main power received via the connection matrix 2 to provide to the PCDS 2. When main power received via the selection device 2 is disrupted, the power source 2 is turned on, e.g., operated to generate alternative power.

Examples of alternative power include power that is supplied when main power is disrupted. The main power may be disrupted as a result of a fault, e.g., malfunction, lack of function, etc., in a main power supply, a power line that is coupled with the main power supply, and/or a source interface that is coupled with the main power supply. In one embodiment, the alternative power is provided by a battery, a generator, or another main power supply.

The connection matrix 2 receives alternative power via the connection link 2 from the power source 2 and routes the alternative power to the selection device 2. The selection device 2 selects alternative power received via the connection matrix 2 to send to the PCDS 2.

Also, the PSS 1 supplies main power via the connection link 1 and the source interface 1 to the connection matrix 4. The connection matrix 4 routes main power received via the source interface 1 to the selection device 4. The selection device 4 selects main power received via the connection matrix 4 to provide to the PCDS 4. When main power received via the selection device 4 is disrupted, the power source 2 or power source 4 is turned on, e.g., operated to generate alternative power. The connection matrix 4 receives alternative power via the connection link 2 from the power source 2 or receives alternative power via the connection link 4 from the power source 4 and routes the alternative power to the selection device 4. The selection device 4 selects alternative power received via the connection matrix 2 to send to the PCDS 4.

In one embodiment, the power source 4 is an alternative power source for the power source 2. For example, when there is a disruption in alternative power provided by the power source 2 to the PCDS 4, the power source 4 is turned on to generate alternative power to provide to the PCDS 4.

The source interfaces 1 thru Y, the connection matrices 1 thru Y, and the selection devices 1 thru Y are located within a multimode distribution box (MMDB) 112. In one embodiment, a portion of each the source interfaces 1 thru Y are located within the MMDB 112 and the remaining portion of the each of the source interfaces 1 thru Y extends outside the MMDB 112. In an embodiment, the MMDB 112 is located within a data center.

In an embodiment, the MMDB 112 includes any number of selection devices Y that are coupled to the same number of PCDSs Y. For example, the MMDB 112 includes two selection devices 1, one of which is coupled to the PCDS 1 and another one of which is coupled to another PCDS 1. In this example, the MMDB 112 includes three selection devices 3, one of which is coupled to the PCDS 3, another one of which is coupled to another PCDS 3, and yet another one of which is coupled to yet another PCDS 3.

In one embodiment, the selection device Y is replaced with any of the remaining selection devices 1 thru Y−1 and the remaining selection device, which is the replacement, is coupled to a corresponding PCDS. For example, the selection device 1 is replaced with the selection device 3 and the selection device 3, which is the replacement device, is coupled with a PCDS 3. In this example, after the replacement, the MMDB 112 includes two selection devices 3, one of which is coupled with a PCDS 3 and another one of which is coupled with another PCDS 3.

Figure 2:
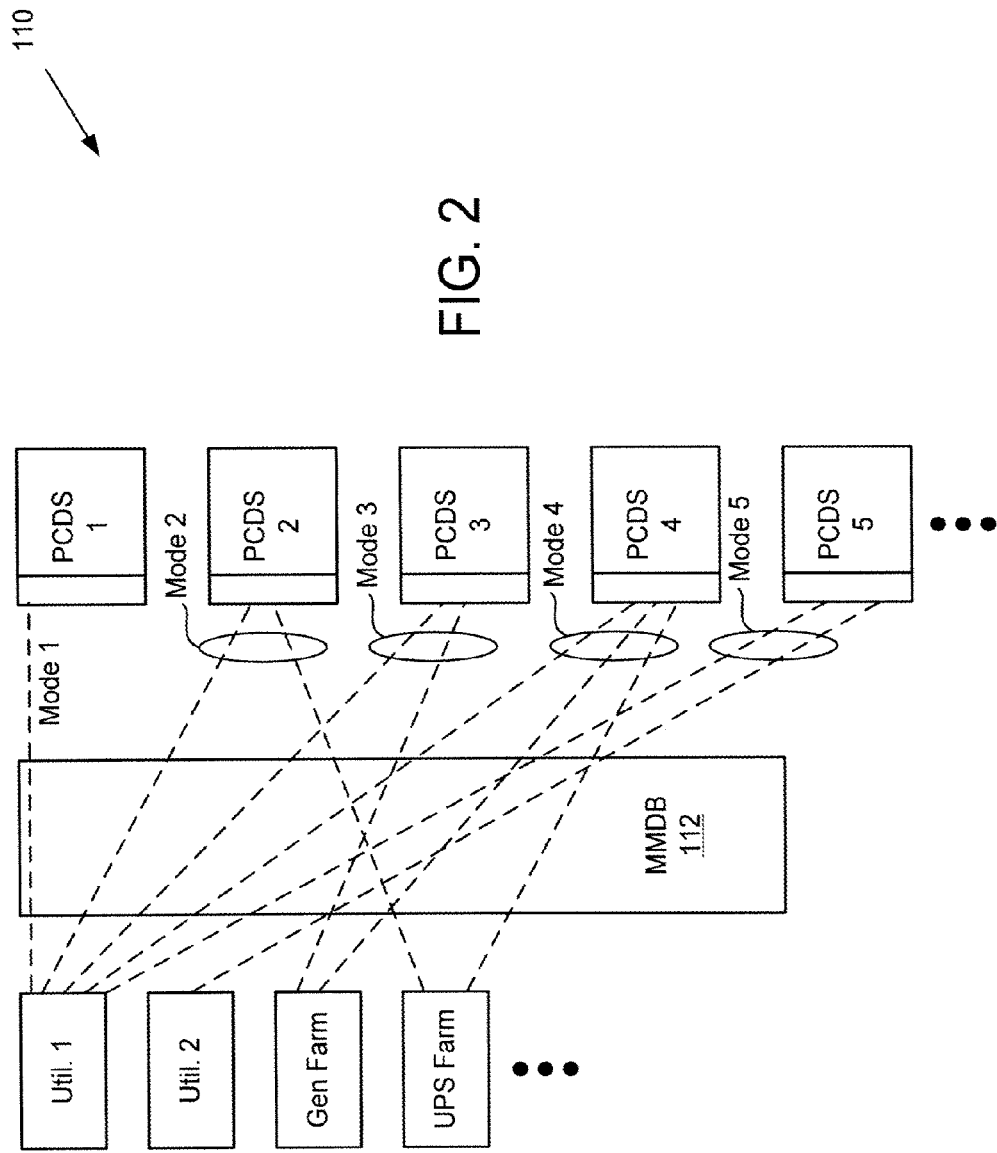
FIG. 2 is a diagram of a system for illustrating various modes of a multimode distribution box (MMDB), in accordance with an embodiment of the present invention.

FIG. 2 is a diagram of an embodiment of a system 110 for illustrating various modes of the MMDB 112. The PCDS 1 is coupled with a utility power supply 1 via the MMDB 12 to receive main power from the utility power supply 1. The coupling of the PCDS 1 to receive main power from the utility power supply 1 via the MMDB 12 is sometimes referred to herein as mode 1 operation of the MMDB 112. In mode 1 operation, the PCDS 1 cannot be coupled with any of the remaining power supplies, e.g., utility power supply 2, a generator farm, and a UPS farm via the MMDB 12 to receive alternative power from one of the remaining power supplies.

Moreover, the PCDS 2 is coupled with the utility power supply 1 via the MMDB 12 to receive main power from the utility power supply 1. When the main power to the PCDS 2 is disrupted, the UPS farm is activated, e.g., turned on, and the PCDS 2 is coupled with the UPS farm to receive alternative power from the UPS farm via the MMDB 112. The coupling of the PCDS 2 to receive main power from the utility power supply 1 via the MMDB 12 or the coupling of the PCDS 2 to receive alternative power from the UPS farm is sometimes referred to herein as mode 2 operation of the MMDB 112. In mode 2 operation, the PCDS 2 cannot be coupled with any of the remaining power supplies, e.g., utility power supply 2 and a generator farm via the MMDB 12 to receive alternative power from one of the remaining power supplies.

Also, the PCDS 3 is coupled with the utility power supply 1 via the MMDB 12 to receive main power from the utility power supply 1. When the main power to the PCDS 3 is disrupted, the generator farm is activated and the PCDS 3 is coupled with the generator farm to receive alternative power from the generator farm via the MMDB 112. The coupling of the PCDS 3 to receive main power from the utility power supply 1 via the MMDB 12 or the coupling of the PCDS 3 to receive alternative power from the generator farm is sometimes referred to herein as mode 3 operation of the MMDB 112. In mode 3 operation, the PCDS 3 cannot be coupled with any of the remaining power supplies, e.g., utility power supply 2 and the UPS farm via the MMDB 12 to receive alternative power from one of the remaining power supplies.

Furthermore, the PCDS 4 is coupled with the utility power supply 1 via the MMDB 12 to receive main power from the utility power supply 1. When the main power to the PCDS 4 is disrupted, the UPS or generator farm is activated and the PCDS 4 is coupled with the UPS or generator farm to receive alternative power from the UPS or generator farm via the MMDB 112. The coupling of the PCDS 4 to receive main power from the utility power supply 1 via the MMDB 12 or the coupling of the PCDS 4 to receive alternative power from the UPS or generator farm is sometimes referred to herein as mode 4 operation of the MMDB 112. In mode 4 operation, the PCDS 4 cannot be coupled with any of the remaining power supplies, e.g., utility power supply 2, to receive alternative power from one of the remaining power supplies.

Moreover, the PCDS 5 is coupled with the utility power supply 1 via the MMDB 12 to receive main power from the utility power supply 1. When the main power to the PCDS 5 is disrupted, the utility power supply 2 is activated and the PCDS 5 is coupled with the utility power supply 2 to receive alternative power from the utility power supply 2 via the MMDB 112. The coupling of the PCDS 5 to receive main power from the utility power supply 1 via the MMDB 12 or the coupling of the PCDS 5 to receive alternative power from the utility power supply 2 is sometimes referred to herein as mode 5 operation of the MMDB 112. In mode 5 operation, the PCDS 5 cannot be coupled with any of the remaining power supplies, e.g., the generator farm and the UPS farm, to receive alternative power from one of the remaining power supplies.

Figure 3:
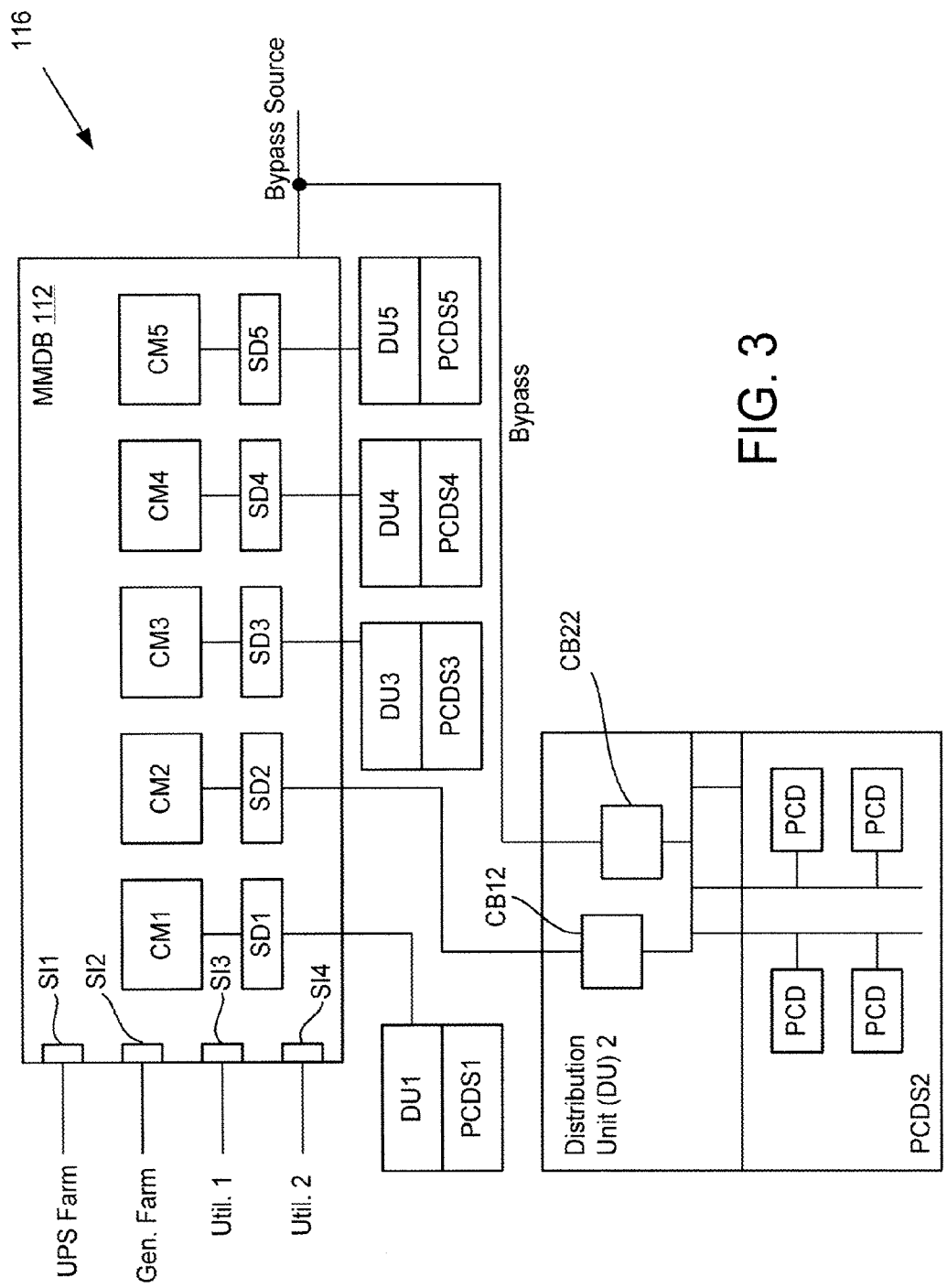
FIG. 3 is a block diagram of a system to illustrate a bypass mode of the MMDB, in accordance with one embodiment of the present invention.

FIG. 3 is a block diagram of an embodiment of a system 116 to illustrate a bypass mode of the MMDB 112. The MMDB 112 is coupled with a distribution unit 2, e.g., PDU, which distributes power received via the connection matrix 2 and the selection device 2 to one or more PCDs of PCDS 2. Similarly, the MMDB 112 is coupled with distribution units 1 and 3 thru 5, which distribute power received via the corresponding connection matrices 1 and 3 thru 5 and corresponding selection devices 1 and 3 thru 5 to one or more PCDs of corresponding PCDSs 1 and 3 thru 5.

A bypass mode of the MMDB 112 is used when a selection device is replaced with another selection device to change modes. For example, when the selection device 2 is replaced with the same type of selection device or another one of selection devices 1 and 3 thru 5 to change from mode 2 to the same type or mode or another mode, a circuit breaker (CB) 12 opens and another circuit breaker 22 closes. The circuit breaker 12, when closed, facilitates communication of power to the PCDS 2. The circuit breaker 22 is closed when the circuit breaker 12 is open. When the circuit breaker 22 is closed, the PCDS 2 receives power from a bypass source, e.g., a generator farm, a utility power supply, an UPS, etc. Bypass mode is used to reduce chances of an interruption in power that is supplied to a PCDS. When the selection device 2 is finished replacing with the same type of selection device or another one of selection devices 2 thru 5, the circuit breaker 22 is opened and the circuit breaker 12 is closed. When the circuit breaker 12 is closed after being opened, the PCDS 2 receives power via the connection matrix 2 from any of selection devices 1 thru 5, which is the replacement of the selection device 2. The switching between the main power source, the bypass source, and the alternative power source is done to reduce chances of interruption in power supplied to the PCDS 2.

Figure 4:
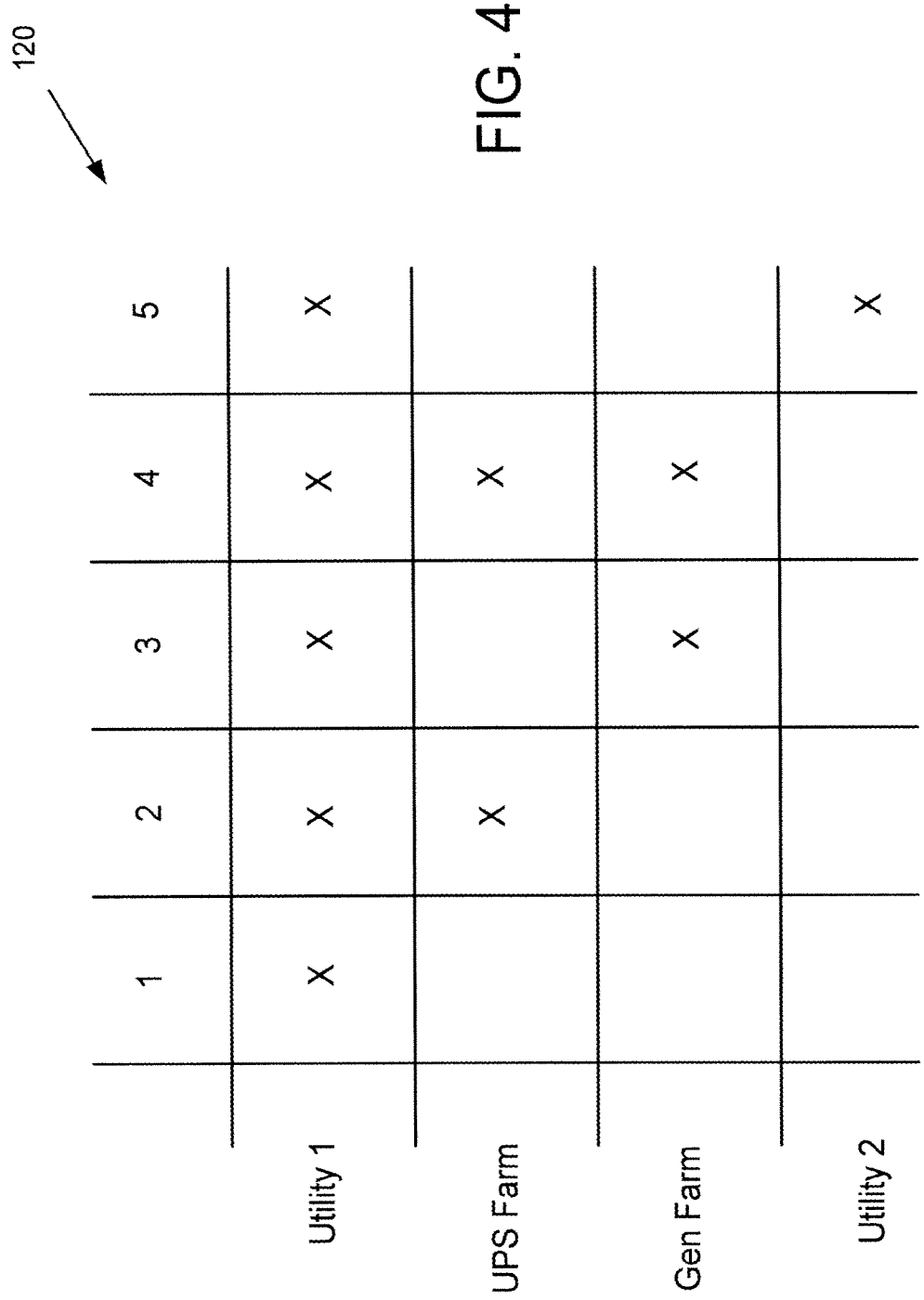
FIG. 4 is a diagram of a truth table to illustrate use of various modes of the MMDB, in accordance with an embodiment of the present invention.

FIG. 4 is a diagram of an embodiment of a truth table 120 to illustrate use of various modes of the MMDB 112 (FIG. 3). As shown in the truth table 120, during mode 1, the utility power supply 1 is turned on to provide power to the PCDS 1 (FIG. 2). Moreover, during mode 2, the PCDS 2 (FIG. 2) receives power from the utility power supply 1 or the UPS farm. During mode 3, the PCDS 3 (FIG. 2) receives power from the utility power supply 1 or the generator farm. During another mode 4, the PCDS 4 (FIG. 2) receives power from the utility power supply 1, the UPS farm, or the generator farm. During mode 5, the PCDS 5 (FIG. 2) receives power from the utility power supply 1 or the utility power supply 2. It should be noted that the truth table can be extended to include any number of power supplies and any number of modes of operation of the MMDB 112.

Figure 5A:
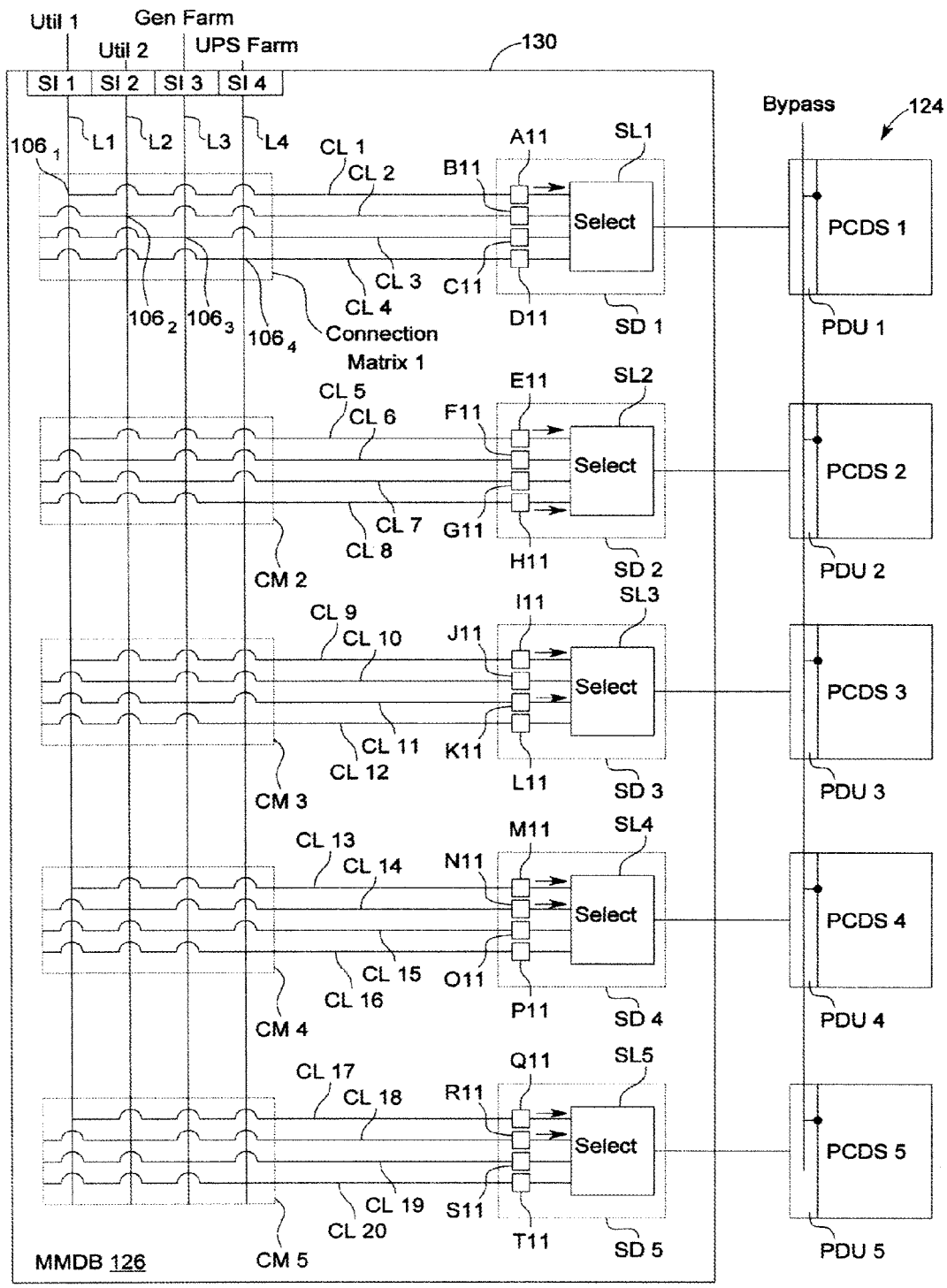
FIG. 5A is a diagram of a system for using five modes of operation of an MMDB to provide power to PCDSs, in accordance with one embodiment of the present invention.

FIG. 5A is a diagram of an embodiment of a system 124 for using five modes of operation of an MMDB 126 to provide power to PCDSs 1 thru 5. The MMDB 126 is an example of the MMDB 112 (FIG. 1). The MMDB 126 has a housing 130. In one embodiment, a housing of an MMDB is made of a solid material, e.g., a metal, a sheet metal, an alloy of metals, a plastic, etc. Examples of a metal include steel, iron, aluminum, copper, silver, etc. The housing 130 encloses connection matrices 1, 2, 3, 4, and 5 and multiple selection devices SD 1, SD2, SD3, SD4, and SD5. The housing 130 encloses the source interfaces 1 thru 4. In one embodiment, the housing 130 encloses a portion of each of the source interfaces 1 thru 4.

Within the MMDB 126, a connection $106_1$ couples a connection line L1 with a connection line CL1. Moreover, a connection $106_2$ couples a connection line L2 with a connection line CL2, a connection $106_3$ couples a connection line L3 with a connection line CL3, and a connection $106_4$ couples a connection line L4 with a connection line CL4. The connection line L1 is not coupled with the connection line CL2, CL3, or CL4. Moreover, the connection line L2 is not coupled with the connection line CL1, CL3, and CL4. Also, the connection line L3 is not coupled with the connection line CL1, CL2, and CL4. The connection line L4 is not coupled with the connection line CL1, CL2, and CL3. The connections 106 are within the connection matrix CM 1.

Each connection matrix CM 2 thru CM5 has similar connections to that of the connection matrix CM 1. For example, within the connection matrix CM 2, the connection line L1 is coupled with a connection line CL5 via a connection, the connection line L2 is coupled with a connection line CL6 via a connection, the connection line L3 is coupled with the connection line CL7 via a connection, and the connection line L4 is coupled with the connection line CL8 via a connection. Similarly, the connection lines CL9 thru CL 20 are coupled with the corresponding lines L1 thru L4 as shown.

The connection line CL1 is coupled to a select interface A11, which is further coupled to a select SL1. The select SL1 is coupled via a PDU 1 to the PCDS 1. Similarly, the connection line CL2 is coupled to a select interface B11, which is further coupled to the select SL1, the connection line CL3 is coupled to a select interface C11, which is further coupled to the select SL1, and the connection line CL4 is coupled to a select interface D11, which is further coupled to the select SL1.

Similarly, the connection lines CL5 thru CL20 are coupled with corresponding select interfaces E11 thru T11 as shown in FIG. 5A. For example, the connection line CL5 is coupled with the select interface E11. Moreover, the select interfaces E11 thru T11 are coupled with corresponding selects SL2 thru SL5 as shown. For example, the select interfaces E11, F11, G11, and H11 are coupled with the select SL2. Also, the selects SL2 thru SL5 are coupled via corresponding PDUs 2 thru 5 with the corresponding PCDSs 2 thru 5. For example, the select SL2 is coupled via the PDU 2 to the PCDS 2.

A select interface includes one or more electric circuit components to facilitate transfer of a power signal via a corresponding select to provide compatibility with a PCDS that is coupled with the select interface. For example, the select interface A11 includes one or more electric circuit components to facilitate transfer of a power signal via the select SL1 to provide compatibility with the PCDS 1 that is coupled with the select interface A11. As another example, the select interface A11 includes one or more transformers, one or more electric switches, one or more circuit breakers, one or more inverters, or a combination thereof, to facilitate a conversion of power. As an example, power received via the connection line CL1 is converted from a first voltage level to a second voltage level within the select interface A11. The second voltage level is compatible with PCDS 1.

In one embodiment, each select interface that is coupled with a select has a different function and/or structure compared to another select interface that is coupled with the select. For example, when the select interface E11 is coupled to a main power supply and the PCDS 2 is compatible with an AC voltage, the select interface E11 lacks an inverter that converts AC voltage to a DC voltage. In this example, when the select interface H11 is coupled to the UPS and the PCDS 2 is compatible with an AC voltage and the source interface 4 lacks a DC to AC inverter, the select interface H11 includes an inverter that converts a DC voltage to an AC voltage.

As shown, the connection lines L1 thru L4 are vertical lines and the connection lines CL1 thru CL4 are horizontal lines. In several embodiments, the connection lines L1 thru L4 extend in any direction and the connection lines CL1 thru CL4 extend in any direction.

During mode 1 of the MMDB 126, main power is supplied by the utility power source 1 to the source interface 1. The source interface 1 converts the main power received from the utility power source 1 into main power that is compatible with the PCDS 1. Main power received from the source interface 1 is communicated via the connection line L1, the connection $106_1$, and the connection line CL1 to the select interface A11. The select interface A11 converts main power received via the connection line CL1 into main power that is compatible with the PCDS 1. Main power received from the select interface A11 is communicated to the PDU 1, which distributes main power to PCDs of PCDS 1.

During mode 2 of the MMDB 126, main power is supplied by the utility power source 1 to the source interface 1. Main power received from the source interface 1 is communicated via the connection line L1, a connection coupling the connection line L1 with the connection line CL5, and the connection line CL5 to the select interface E11. The select interface E11 converts the main power received via the connection line CL5 into main power that is compatible with the PCDS 2. Main power received from the select interface E11 is communicated to the select SL2, which routes the main power to PDU 2. The PDU 2 distributes the main power received from the select SL2 to PCDs of PCDS 2.

Moreover, during mode 2, when main power received from the utility power supply 1 is disrupted, the UPS farm is activated. In one embodiment, the main power received from the utility power supply 1 by the PCDS 2 is disrupted as a result of a fault in the utility power source 1, a connection link coupling the source interface 1 with the utility power source 1, the source interface 1, the line L1, the connection line CL5, the source interface E11, the select SL2, a link between the select SL2 and the PDU 2, or a combination thereof.

During mode 2, when the UPS farm is turned on, alternative power is supplied by the UPS farm to the source interface 4. Alternative power received from the source interface 4 is communicated via the connection line L4, a connection coupling the connection line L4 with the connection line CL8, and the connection line CL8 to the select interface H11. The select interface H11 converts the alternative power received via the connection line CL8 into alternative power that is compatible with the PCDS 2. Alternative power received from the select interface H11 is communicated to the select SL2, which routes the alternative power to PDU 2. The PDU 2 distributes the alternative power received from the select SL2 to PCDs of PCDS 2.

During mode 3, main power received from the utility power supply 1 is supplied to the PCDS 3 via the source interface 1, the connection line L1, a connection between the connection line L1 and the connection line CL9, the connection line CL9, the select interface I11, the select SL3, and the PDU 3 to the PCDS 3. Also, during mode 3, when there is a disruption in main power supplied by the utility power supply 1, the generator farm is activated to supply alternative power.

Alternative power is supplied by the generator farm to the source interface 3. Alternative power received from the source interface 3 is communicated via the connection line L3, a connection coupling the connection line L3 with the connection line CL11, and the connection line CL11 to the select interface K11. The select interface K11 converts the alternative power received via the connection line CL11 into alternative power that is compatible with the PCDS 3. Alternative power received from the select interface K11 is communicated to the select SL3, which routes the alternative power to PDU 3. The PDU 3 distributes the alternative power received from the select SL3 to PCDs of PCDS 3.

During mode 4, main power received from the utility power supply 1 is supplied to the PCDS 4 via the source interface 1, the connection line L1, a connection between the connection line L1 and the connection line CL13, the connection line CL13, the select interface M11, the select SL4, and the PDU 4 to the PCDS 4. Also, during mode 4, when there is a disruption in main power supplied by the utility power supply 1, the generator farm or the UPS farm is activated to supply alternative power.

Furthermore, during mode 4, alternative power is supplied from the generator farm to the PCDS 4 via the source interface 3, the connection line L3, a connection between the connection line L3 and the connection line CL15, the connection line CL 15, the select interface O11, the select SL4, and the PDU 4. As an alternative to supplying power from the generator farm, alternative power is supplied from the UPS farm to the PCDS 4 via the source interface 4, the connection line L4, a connection between the connection line L4 and the connection line CL16, the connection line CL16, the select interface P11, the select SL4, and the PDU 4.

During mode 5, main power received from the utility power supply 1 is supplied to the PCDS 5 via the source interface 1, the connection line L1, a connection between the connection line L1 and the connection line CL17, the connection line CL17, the select interface Q11, the select SL5, and the PDU 5 to the PCDS 5. Moreover, during mode 5, alternative power is supplied by the utility power supply 2 to the source interface 2. Alternative power received from the source interface 2 is communicated via the connection line L2, a connection coupling the connection line L2 with the connection line CL18, and the connection line CL18 to the select interface R11. The select interface R11 converts the alternative power received via the connection line CL18 into alternative power that is compatible with the PCDS 4. Alternative power received from the select interface R11 is communicated to the select SL5, which routes the alternative power to PDU 5. The PDU 5 distributes the alternative power received from the select SL5 to PCDs of PCDS 5.

It should be noted that in one embodiment, the system 124 excludes the select interfaces A11 thru T11. In this embodiment, the connections lines CL1 thru CL 20 are coupled to the corresponding selects SL1 thru SL5 without being coupled with the select interfaces A11 thru T11.

It should further be noted that in an embodiment, any output of the MMDB 126, e.g., output of the select SL1, SL2, SL3, SL4, or SL5, can be configured or reconfigured to operate in the mode 1, 2, 3, 4, or 5. For example, when instead of the PCDS 1, another PCDS (not shown), which is the same as the PCDS 3, is coupled to the connection matrix 1 via the selection device SD 1, the connection matrix 1 is configured to operate in mode 3. In this example, main power received from the utility power supply 1 is supplied to the other PCDS or alternative power is supplied from the generator farm to the other PCDS. The main power received from the utility power supply 1 is supplied to the other PCDS via the source interface 1, the connection line L1, the connection $106_1$, the connection line CL1, the select interface A11, the select SL1, and the PDU 1 to the PCDS 3. Also, during mode 3, when there is a disruption in main power supplied by the utility power supply 1, alternative power is supplied by the generator farm to the source interface 3. Alternative power received from the source interface 3 is communicated via the connection line L3, a connection coupling the connection line L3 to the connection line CL3, and the connection line CL3 to the select interface C11. The select interface C11 converts the alternative power received via the connection line CL3 into alternative power that is compatible with the other PCDS. Alternative power received from the select interface C11 is communicated to the select SL1, which routes the alternative power to PDU 1. The PDU 1 distributes the alternative power received from the select SL1 to PCDs of the other PCDS.

Figure 5B:
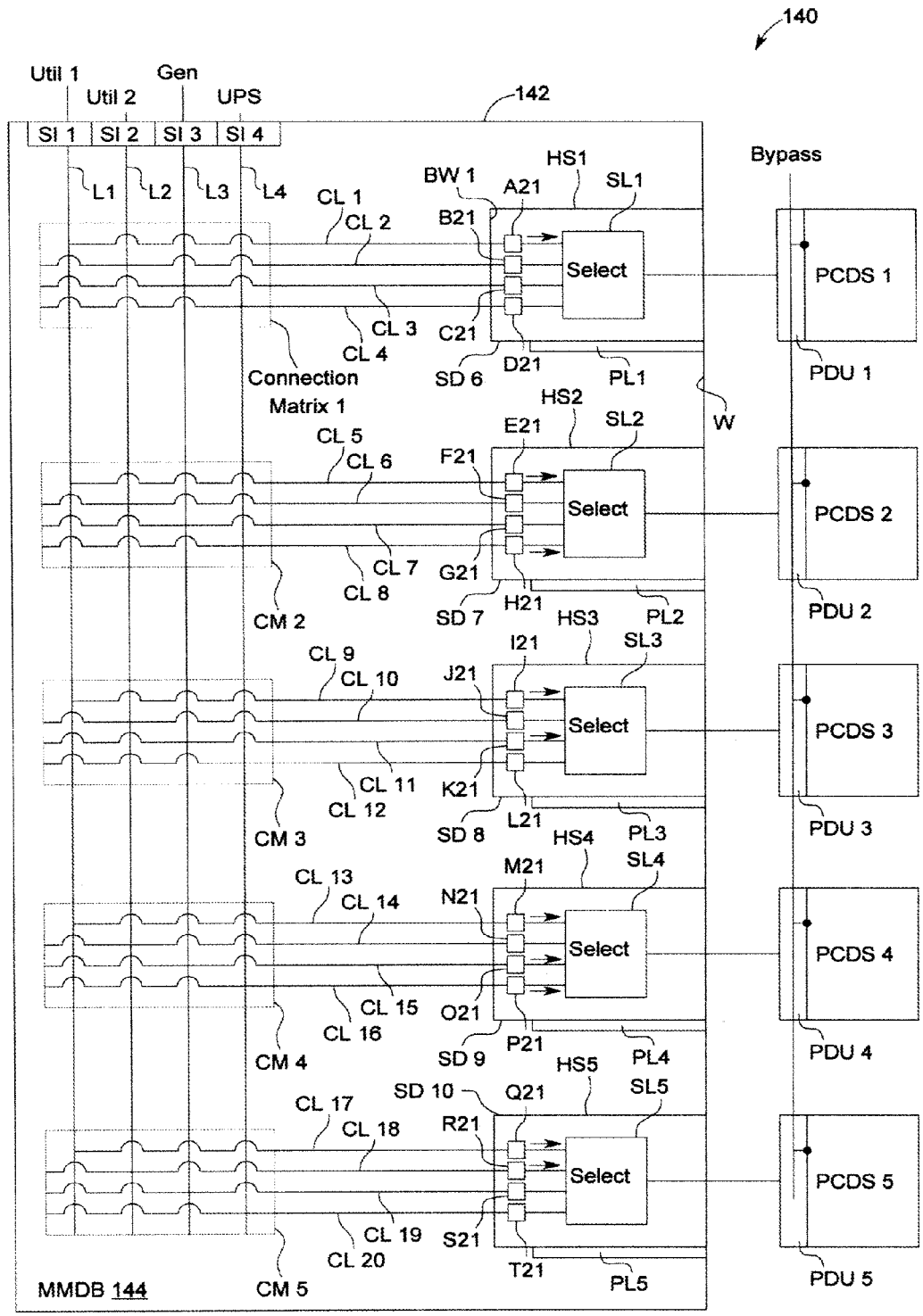
FIG. 5B is a diagram of a system in which selection devices are housed in a housing in addition to being housed within a housing of an MMDB, in accordance with an embodiment of the present invention.

FIG. 5B is a diagram of an embodiment of a system 140 in which selection devices SD 6 thru 10 are housed in a housing in addition to being housed within a housing 142 of an MMDB 144, which is an example of the MMDB 112 (FIG. 1). For example, the selection device SD 6 is enclosed in a housing HS1, the selection device SD 7 is enclosed within a housing HS2, the selection device SD 8 is enclosed within a housing HS3, the selection device SD 9 is enclosed within a housing HS4, and the selection device SD 10 is enclosed within a housing HS5.

In one embodiment, each housing of a selection device is supported on a platform within the housing 142. For example, a platform PL1 supports the housing HS1, another platform PL2 supports the housing HS2, yet another platform PL3 supports the housing HS3, another platform PL4 supports the housing HS4, and a platform PL5 supports the housing HS5. Each platform is attached, e.g., bolted, glued, etc., to a wall W of the housing 142.

Each housing HS1 thru HS5 is inserted within a slot of the housing 142 to couple a corresponding selection device SD6 thru SD10 to a corresponding set of connection lines CL1 thru CL 20. For example, the housing HS1 is inserted within a slot of the housing 142 to couple the selection device SD6 to the connection lines CL1 thru CL4. As another example, the housing HS2 is inserted within a slot of the housing 142 to couple the selection device SD7 to the connection lines CL5 thru CL8, the housing HS3 is inserted within a slot of the housing 142 to couple the selection device SD8 to the connection lines CL9 thru CL12, the housing HS4 is inserted within a slot of the housing 142 to couple the selection device SD 9 to the connection lines CL13 thru CL16, and the housing HS5 is inserted within a slot of the housing 142 to couple the selection device SD10 to the connection lines CL17 thru CL20. Similarly, each housing HS1 thru HS5 can be removed from the corresponding slots.

The housing HS1 includes the select SL1 and multiple select interfaces A21 thru D21. Moreover, the housing HS2 includes the select SL2 and multiple select interfaces E21 thru H21, the housing HS3 includes the select SL3 and multiple select interfaces I21 thru L21, the housing HS4 includes the select SL4 and multiple select interfaces M21 thru P21, and the housing HS5 includes the select SL5 and multiple select interfaces Q21 thru T21.

In one embodiment, each select interface A21 thru T21 extends through a back wall of a corresponding housing HS1 thru HS5. For example the select interfaces A21 thru D21 extend through a back wall BW1 of the housing HS1.

Each select interface A21 thru T21 is the same as that of the corresponding select interfaces A11 thru T11 (FIG. 5A) except that the select interfaces A21 thru T21 include connectors to couple with the corresponding connection lines CL1 thru CL20. For example, the select interface A21 is the same as that of the select interface A11 except that the select interface A21 includes a connector that couples with the connection line CL1 when the housing HS1 is inserted into the housing 142.

It should be noted that in one embodiment, the system 140 excludes the select interfaces A21 thru T21 and selects SL1 thru SL5 are coupled to corresponding connection lines CL1 thru CL20 via corresponding connectors. For example, multiple connectors couple the select SL1 to the connection lines CL1 thru CL4.

Figure 5C:
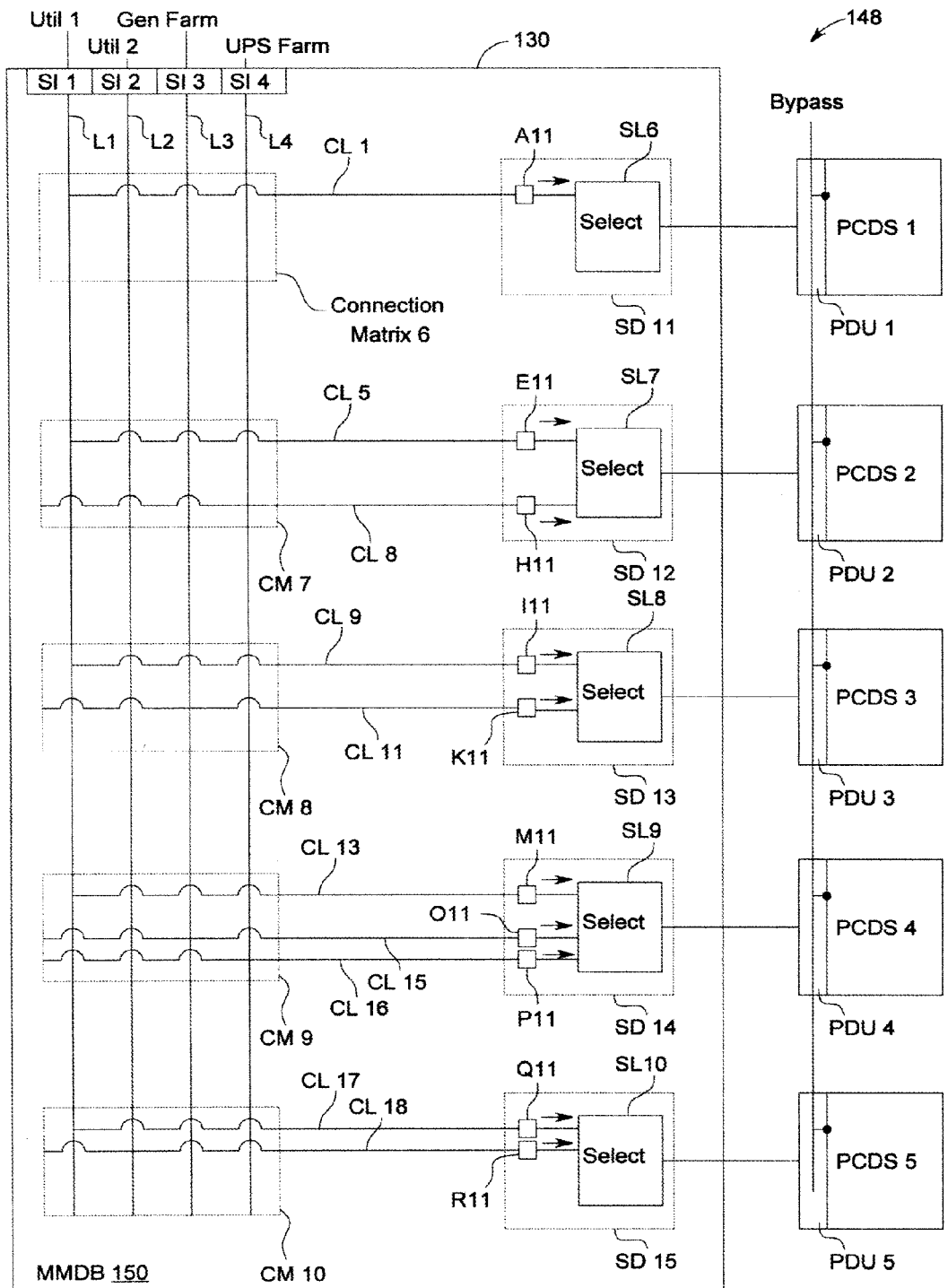
FIG. 5C is a diagram of a system for providing power from one or more power Sources to corresponding PCDS and that uses lesser real estate than that used by the system of FIG. 5A, in accordance with one embodiment of the present invention.

FIG. 5C is a diagram of an embodiment of a system 148 for providing power from one or more of the utility power supply 1, the utility power supply 2, the UPS farm, and the generator farm to corresponding PCDSs 1 thru 5. The system 150 is the same as the system 124 of FIG. 5A except that the system 148 includes an MMDB 150 that uses lesser real estate, e.g., conductors, select interfaces, etc., than the MMDB 126 of FIG. 5A. For example, the MMDB 150 excludes the connection lines CL2 thru CL4, CL6, CL7, CL10, CL12, CL14, CL19, and CL 20, and excludes the select interfaces B11 thru D11, F11, G11, J11, L11, N11, S11, and T11. The lack of the connection line CL2 does not allow the PCDS 1 to receive alternative power from the utility power source 2. Moreover, the lack of the connection line CL 3 does not allow the PCDS 1 to receive alternative power from the generator farm and the lack of the connection line CL 4 does not allow the PCDS 1 to receive alternative power from the UPS farm. Similarly, the lack of the connection lines CL 6 and CL 7 reduces, e.g., eliminates, chances of the PCDS 2 from receiving alternative power from the utility power supply 2 and the generator farm. Also, the lack of the connection lines CL 10 and CL 12 reduces, e.g., eliminates, chances of the PCDS 3 from receiving alternative power from the utility power supply 2 and the UPS farm. The lack of the connection line CL 14 reduces, e.g., eliminates, etc., chances of the PCDS 4 from receiving alternative power from the utility power supply 2. The lack of the connection lines CL 19 and CL 20 reduces, e.g., eliminates, chances of the PCDS 5 from receiving alternative power from the UPS farm and the generator farm.

The MMDB 150 is an example of the MMDB 112 (FIG. 1). Moreover, selects SL6 thru SL10 are different than the selects SL1 thru SL5 of system 124 of FIG. 5A.

A connection matrix 6 includes a portion of the connection line CL1 and portions of the connection lines L1 thru L4. Moreover, a connection matrix 7 includes portions of the connection lines CL5 and CL8 and portions of the connection lines L1 thru L4, a connection matrix 8 includes portions of the connection lines CL9 and CL11 and portions of the connection lines L1 thru L4, a connection matrix 9 includes portions of the connection lines CL13, CL15, and CL16 and portions of the connection lines L1 thru L4, and a connection matrix 10 includes portions of the connection lines CL17 and CL18 and portions of the connection lines L1 thru L4.

Moreover, a selection device SD 11 includes the select interface A11 and the select SL6. Also, a selection device SD 12 includes the select interfaces E11 and H11 and the select SL7, a selection device SD 13 includes the select interfaces I11 and K11 and the select SL8, a selection device SD 14 includes the select interfaces M11, O11 and P11 and the select SL9, and a selection device SD 15 includes the select interfaces Q11 and R11 and the select SL10.

In one embodiment, the selects SL6 thru SL10 are the same as the selects SL1 thru SL5. For example, the select SL6 is the same as the select SL1, the select SL7 is the same as the select SL2, the select SL8 is the same as the select SL3, the select SL9 is the same as the select SL4, and the select SL10 is the same as the select SL5. It should be noted that in an embodiment, the system 148 excludes the select interfaces A11, E11, H11, I11, K11, M11, P11, Q11, and R11.

Figure 5D:
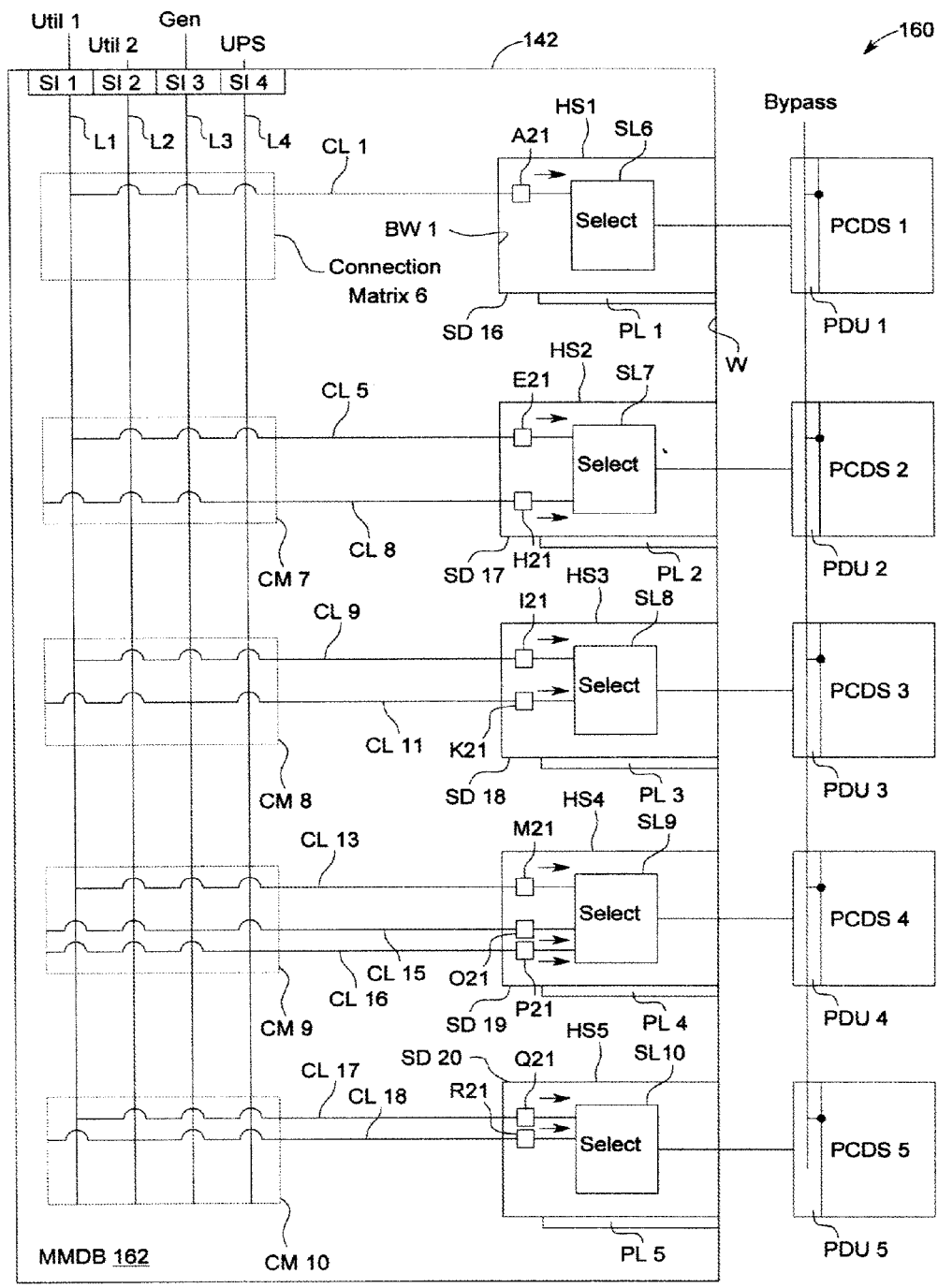
FIG. 5D is a diagram of a system in which selection devices are housed in a housing in addition to being housed within a housing of an MMDB and that uses lesser real estate than that used by the system of FIG. 5A, in accordance with one embodiment of the present invention.

FIG. 5D is a diagram of an embodiment of a system 160 in which selection devices SD 16 thru 20 are housed in a housing in addition to being housed within the housing 142 of an MMDB 162. The MMDB 162 is an example of the MMDB 112 (FIG. 1). The system 160 is the same as the system 140 of FIG. 5B except that the system 160 uses lesser real estate compared to the system 140. For example, the system 160 excludes the connection lines CL2 thru CL4, CL6, CL7, CL10, CL12, CL14, CL19, and CL 20, and excludes the select interfaces B21 thru D21, F21, G21, J21, L21, N21, S21, and T21. It should be noted that in an embodiment, the system 160 excludes the select interfaces A21, E21, H21, I21, K21, M21, P21, Q21, and R21 and selects SL6 thru SL10 are coupled to corresponding connection lines CL1, CL5, CL8, CL9, CL11, CL13, CL15, CL16, CL17, and CL18 via corresponding connectors. For example, a connector couples the select SL6 to the connection line CL1.

In an embodiment, a main electrical switchboard is located between a power source and a source interface that is coupled with the power source. For example, an electrical switchboard is located between a first group including the utility power supply 1, the utility power supply 2, the UPS farm, and the generator farm and a second group including the source interfaces 1 thru 4. As another example, one or more switchboards are located between the first and second groups. The electrical switchboard includes electrical devices, e.g., switches, buses, circuit breakers, etc., to split current received from one power source into multiple smaller currents for further distribution. For example, an electrical switchboard located between the utility power supply 1 and the source interface 1 distributes power received from the utility power supply 1 into smaller power levels, e.g., smaller currents, etc., which are sent to the source interface 1.

Figure 6A:
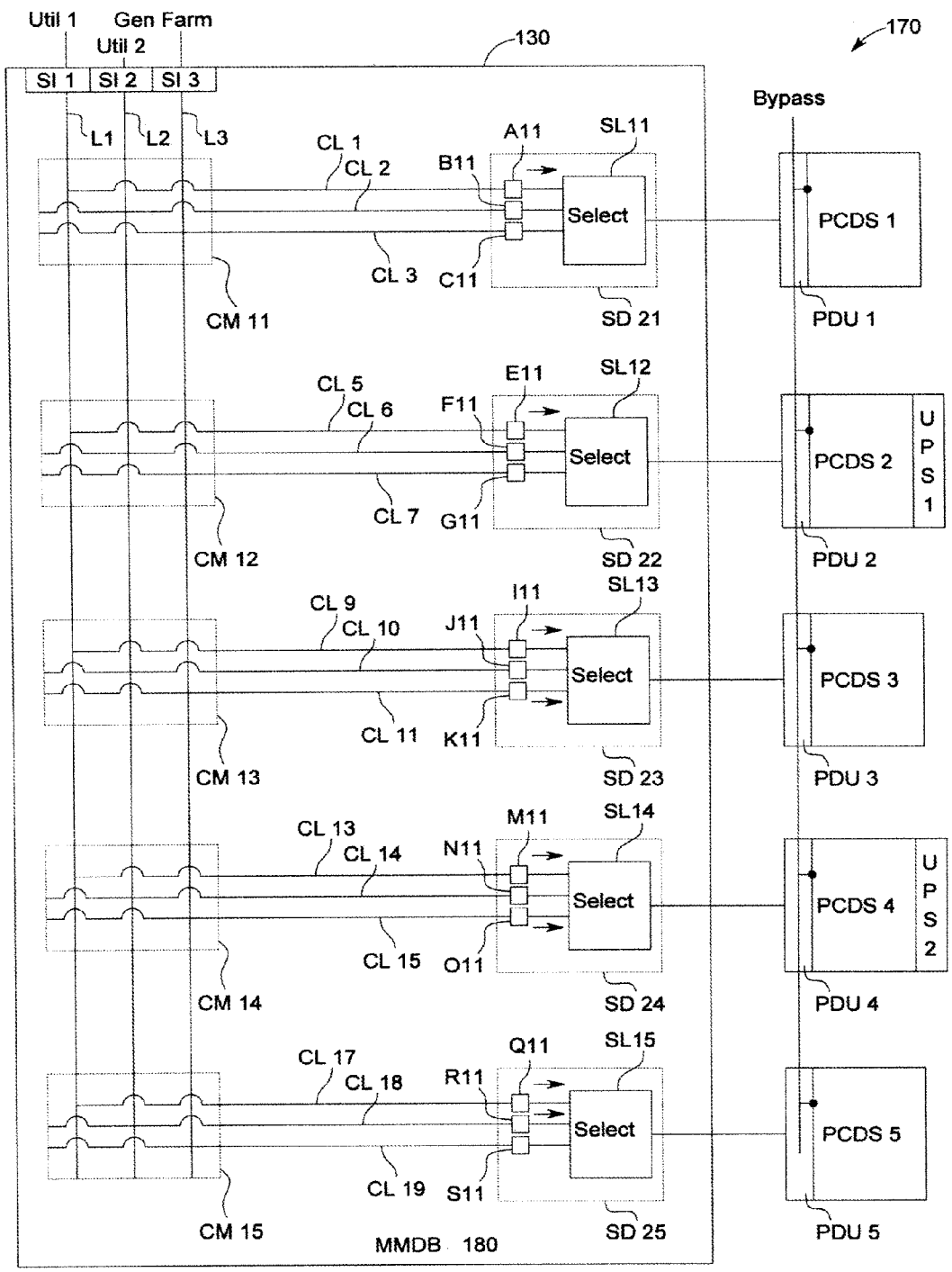
FIG. 6A is a diagram of a system for providing power from a power source without using an MMDB, in accordance with one embodiment of the present invention.

FIG. 6A is a diagram of an embodiment of a system 170 for providing power from one or more of the utility power supplies 1 and 2, and the generator farm to corresponding PCDS 1 thru 5. The system 170 is the same as the system 124 of FIG. 5A except that UPSs are coupled with corresponding PCDS 2 and 4 without being coupled via an MMDB 180. For example, a UPS 1 is coupled with PCDS 2 without being coupled to the PCDS 2 via the source interface 4, the connection line L4, the connection line CL8, the select interface H11, the select SL12, and the PDU 2. The MMDB 180 is an example of the MMDB 112 (FIG. 1). In case of a disruption in main power, the UPS 1 is activated and the UPS 1 provides alternative power to the PCDS 2.

As another example, a UPS 2 is coupled with PCDS 4 without being coupled to the PCDS 4 via the source interface 4, the connection line L4, the connection line CL16, the select interface P11, the select SL14, and the PDU 4. In case of a disruption in main power, the UPS 2 is activated and the UPS 2 provides alternative power to the PCDS 4.

The system 170 is the same as the system 124 of FIG. 5A except that the system 170 uses lesser real estate within the MMDB 180 compared to that within the MMDB 124. For example, the MMDB 180 excludes the source interface 4, the connection line L4, the connection lines CL4, CL8, CL12, CL16, and CL 20, and the select interfaces D11, H11, L11, P11, and T11.

Also, the system 170 is the same as the system 124 except that the system 170 uses selects SL11 thru SL15 instead of the selects SL1 thru SL5 (FIG. 5A). Each select SL11 thru SL15 selects among power signals received via three connection lines instead of four connection lines. Selection between power signals received via four connection lines is made by the selects SL1 thru SL5.

Moreover, a selection device SD 21 includes the select interfaces A11, B11 and C11 and the select SL11. Also, a selection device SD 22 includes the select interfaces E11, F11 and G11 and the select SL12, a selection device SD 23 includes the select interfaces I11, J11 and K11 and the select SL13, a selection device SD 24 includes the select interfaces M11, N11 and O11 and the select SL14, and a selection device SD 25 includes the select interfaces Q11, R11 and S11 and the select SL15.

In several embodiments, instead of an UPS coupled with a PCDS as shown in FIG. 6A, a generator is coupled with the PCDS in the same manner as that of UPS. For example, a generator 1 is coupled with the PCDS 3 and a generator 2 is coupled with the PCDS 4. Moreover, in this example, the MMDB 180 excludes the connection line L3, the source interface 3, the connection lines CL3, CL7, CL11, CL15, and CL19, the select interfaces C11, G11, K11, O11, and S11. Also, in this example, the MMDB 180 includes the source interface 4, the connection line L4, the connection lines CL4, CL8, CL12, CL16, and CL 20, and the select interfaces D11, H11, L11, P11, and T11. Furthermore, in this example, in case of a disruption in main power, the generator 1 is activated and the generator 1 provides alternative power to the PCDS 2 and the generator 2 is activated and the generator 2 provides alternative power to the PCDS 4.

In a number of embodiments, instead of each UPS 1 and UPS 2, a number of UPSs are used to provide alternative power. Moreover, in various embodiments, instead of each generator 1 and generator 2, a number of generators are used to provide alternative power. It should be noted that in an embodiment, the system 170 excludes the select interfaces A11 thru C11, E11 thru G11, I11 thru K11, M11 thru O11, and Q11 thru S11.

Figure 6B:
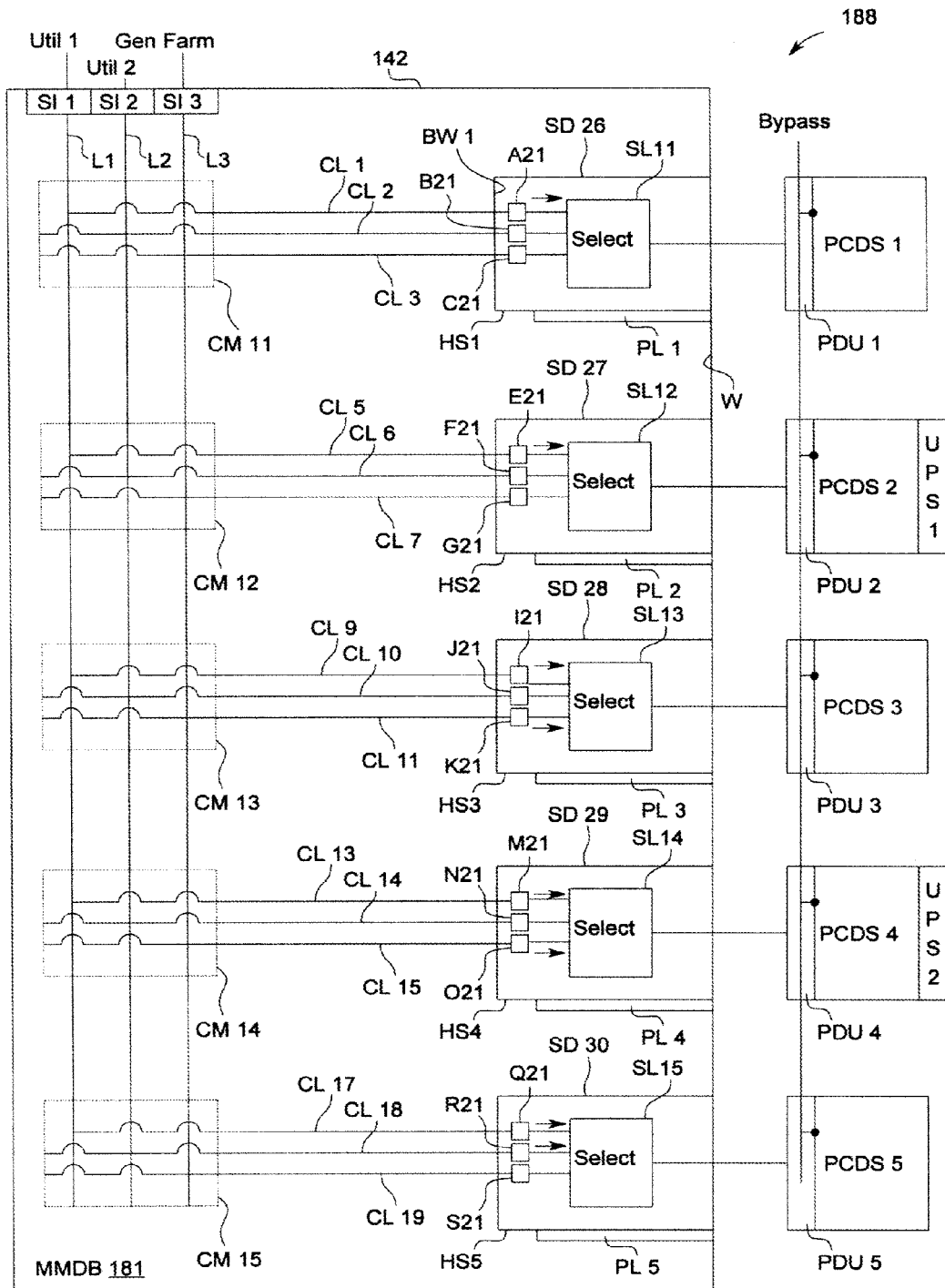
FIG. 6B is a diagram of a system for providing power from a power source without using an MMDB and in which selection devices are housed in a housing in addition to being housed within the housing of the MMDB, in accordance with an embodiment of the present invention.

FIG. 6B is a diagram of an embodiment of a system 188 in which selection devices SD 26 thru 30 are housed in a housing in addition to being housed within the housing 142 of an MMDB 181. For example, the selection device SD 26 is enclosed in the housing HS1, the selection device SD 27 is enclosed within the housing HS2, the selection device SD 28 is enclosed within the housing HS3, the selection device SD 29 is enclosed within the housing HS4, and the selection device SD 30 is enclosed within the housing HS5. The MMDB 181 is an example of the MMDB 112 (FIG. 1).

Each housing HS1 thru HS5 is inserted within a slot of the housing 142 to couple a corresponding selection device SD 26 thru SD 30 to a corresponding set of connection lines CL1 thru C3, CL5, thru CL7, CL9 thru CL11, CL13 thru CL15, and CL17 thru CL19. For example, the housing HS1 is inserted within a slot of the housing 142 to couple the selection device SD 26 to the connection lines CL1 thru CL3. As another example, the housing HS2 is inserted within a slot of the housing 142 to couple the selection device SD 27 to the connection lines CL5 thru CL7, the housing HS3 is inserted within a slot of the housing 142 to couple the selection device SD 28 to the connection lines CL9 thru CL11, the housing HS4 is inserted within a slot of the housing 142 to couple the selection device SD 29 to the connection lines CL13 thru CL15, and the housing HS5 is inserted within a slot of the housing 142 to couple the selection device SD 30 to the connection lines CL17 thru CL19.

The housing HS1 includes the select SL11 and multiple select interfaces A21 thru C21. Moreover, the housing HS2 includes the select SL12 and multiple select interfaces E21 thru G21, the housing HS3 includes the select SL13 and multiple select interfaces I21 thru K21, the housing HS4 includes the select SL14 and multiple select interfaces M21 thru O21, and the housing HS5 includes the select SL15 and multiple select interfaces Q21 thru S21.

In one embodiment, each select interface A21 thru C21, E21 thru G21, I21 thru K21, M21 thru O21, and Q21 thru S21 extends through a back wall of a corresponding housing HS1 thru HS5. For example the select interfaces A21 thru C21 extend through the back wall BW1. It should be noted that in an embodiment, the system 188 excludes the select interfaces A21 thru C21, E21 thru G21, I21 thru K21, M21 thru O21, and Q21 thru S21 and the selects SL11, SL12, SL13, SL14, and SL15 are coupled to corresponding connection lines CL1 thru CL3, CL5 thru CL8, CL9 thru CL11, CL13 thru CL15, and CL17 thru CL19 via corresponding connectors. For example, a connector couples the select SL11 to the connection line CL1 and a connector couples the select SL12 to the connection line CL5.

Figure 6C:
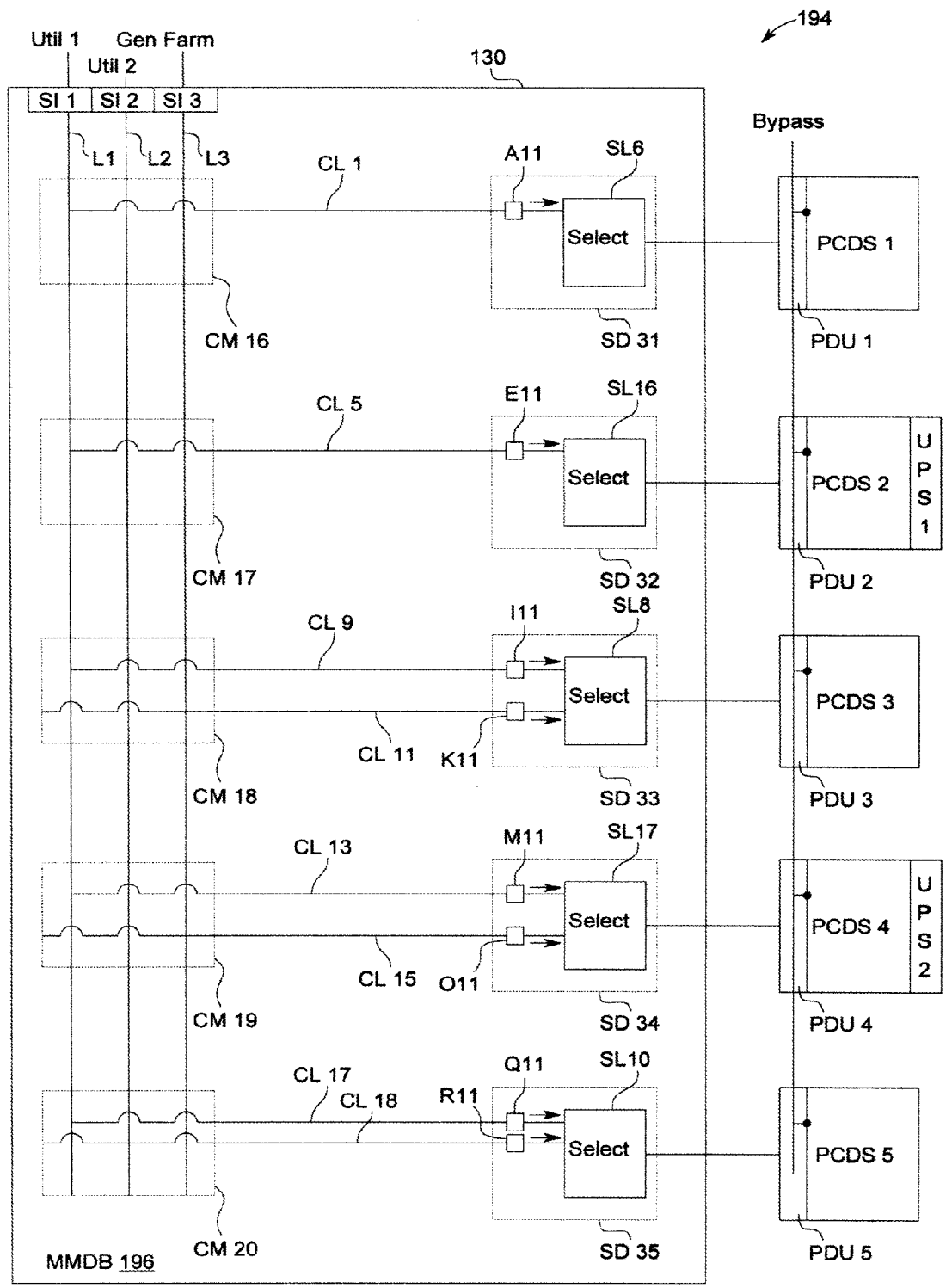
FIG. 6C is a diagram of a system for providing power from a power source without using an MMDB and in which lesser real estate is used than that used in the MMDB of FIG. 6A, in accordance with one embodiment of the present invention.

FIG. 6C is a diagram of an embodiment of a system 194 for providing power from one or more of the utility power supply 1, the utility power supply 2, and the generator farm to corresponding PCDSs 1 thru 5. The system 194 is the same as the system 170 of FIG. 6A except that an MMDB 196 of the system 194 uses lesser real estate, e.g., conductors, select interfaces, etc., than the MMDB 180 of the system 170 (FIG. 6A). For example, the MMDB 196 excludes the connection lines CL2, CL3, CL6, CL7, CL10, CL14 and CL 19, and excludes the select interfaces B11, C11, F11, G11, J11, N11 and S11. Moreover, selects SL16 thru SL17 are different than the selects SL12 thru SL14 of system 170 of FIG. 6A. The MMDB 196 is an example of the MMDB 112 (FIG. 1).

A connection matrix 16 includes a portion of the connection line CL1 and portions of the connection lines L1 thru L3. Moreover, a connection matrix 17 includes a portion of the connection line CL5 and portions of the connection lines L1 thru L3, a connection matrix 18 includes portions of the connection lines CL9 and CL11 and portions of the connection lines L1 thru L3, a connection matrix 19 includes portions of the connection lines CL13 and CL15 and portions of the connection lines L1 thru L3, and a connection matrix 20 includes portions of the connection lines CL17 and CL18 and portions of the connection lines L1 thru L3.

Moreover, a selection device SD 31 includes the select interface A11 and the select SL6. Also, a selection device SD 32 includes the select interface E11 and a select SL16, a selection device SD 33 includes the select interfaces I11 and K11 and the select SL8, a selection device SD 34 includes the select interfaces M11 and O11 and the select SL17, and a selection device SD 35 includes the select interfaces Q11 and R11 and the select SL10.

During mode 2, when main power supplied via the connection line CL5, the select interface E11, the select SL16, and the PDU 2 to the PCDS 2 is disrupted, the UPS 1 supplies alternative power to the PCDS 2. The alternative power is not supplied from the UPS 1 via the MMDB 196.

Moreover, during mode 4, when main power supplied via the connection line CL13, the select interface M11, the select SL17, and the PDU 4 to the PCDS 4 is disrupted, alternative power is supplied from the generator farm or from the UPS 2 to the PCDS 4. The alternative power is not supplied from the UPS 2 via the MMDB 196.

Also, during mode 4, when main power supplied from the utility power supply 1 is disrupted, alternative power is supplied from the generator farm via the source interface 3, the connection line L3, a connection between the connection line L3 and the connection line CL15, the connection line CL15, the select interface O11, the select SL17 and the PDU 4 to the PCDS 4. It should be noted that in an embodiment, the system 194 excludes the select interfaces A11, E11, I11, K11, M11, O11, Q11, and R11.

Figure 6D:
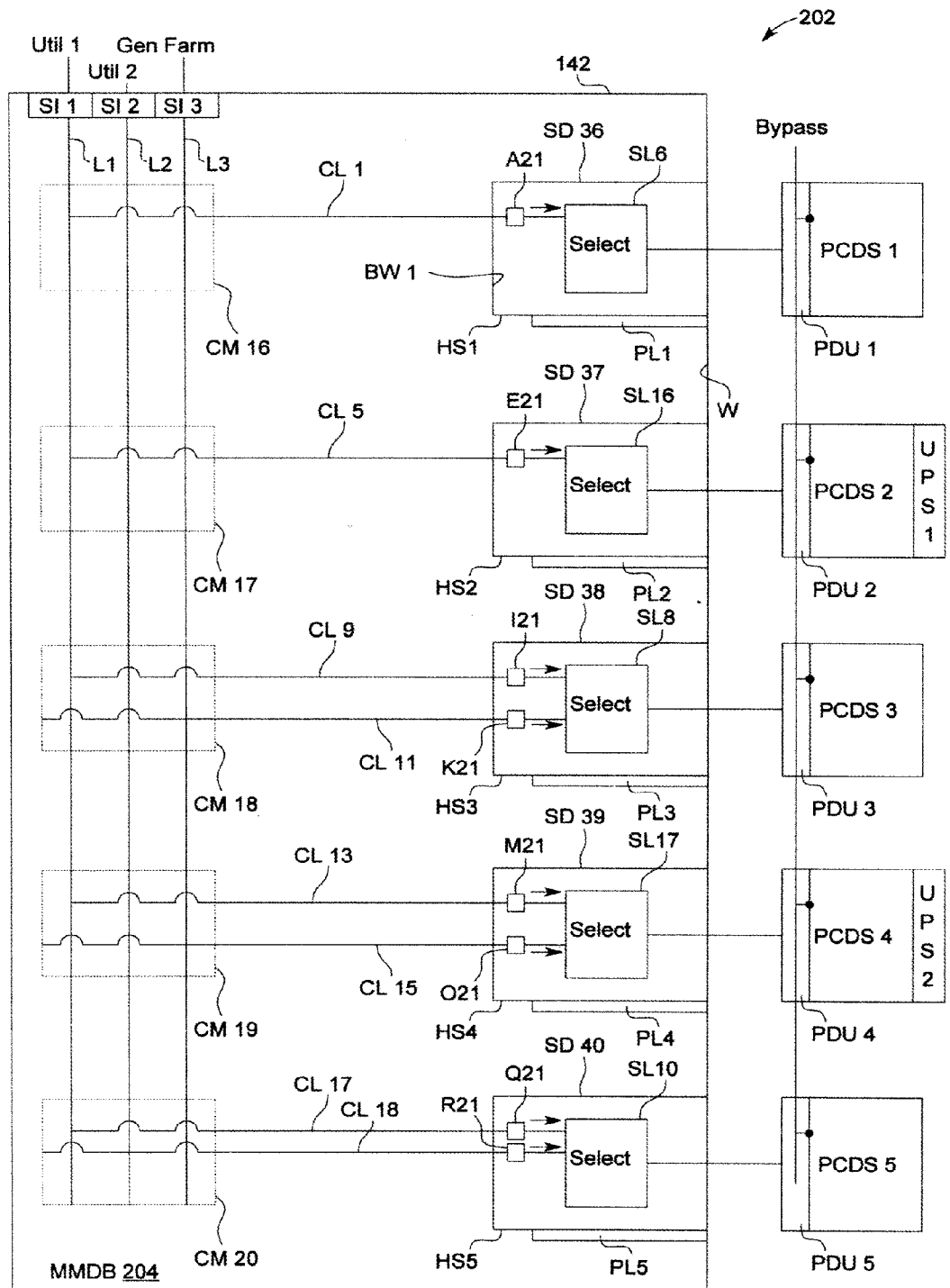
FIG. 6D is a diagram of an embodiment of a system for providing power from a power source without using an MMDB, in which lesser real estate is used than that used in the MMDB of FIG. 6A, and in which selection devices are housed in a separate housing than that of an MMDB, in accordance with an embodiment of the present invention.

FIG. 6D is a diagram of an embodiment of a system 202 in which selection devices SD 36 thru 40 are housed in a housing in addition to being housed within a housing 142 of an MMDB 204. The MMDB 204 is an example of the MMDB 112 (FIG. 1). The system 202 is the same as the system 188 of FIG. 6B except that the system 202 uses lesser real estate compared to the system 188. For example, the system 202 excludes the connection lines CL2, CL3, CL4, CL6, CL7, CL10, CL14 and CL19, and excludes the select interfaces B21, C21, F21, G21, J21, N21 and S21. Moreover, selects SL6, SL16, SL8, SL17, and SL10 are different than the selects SL11 thru SL15 of system 188 of FIG. 6B.

It should be noted that in an embodiment, the system 202 excludes the select interfaces A21, E21, I21, K21, M21, O21, Q21, and R21 and the selects SL6, SL16, SL8, SL17, and SL10 are coupled to corresponding connection lines CL1, CL5, CL9, CL11, CL13, CL15, CL17, and CL18 via corresponding connectors.

It should further be noted that in one embodiment, the one or more PCDs of the PCDS 1 are less critical than the one or more PCDs of the PCDS 2, PCDS 3, PCDS 4, or PCDS 5. For example, the one or more PCDs of the PCDS 1 perform a function that is less crucial to operation of an entity than the one or more PCDs of the PCDS 2. As another example, the one or more PCDs of the PCDS 1 perform functions that are not related to security issues within an entity and the one or more PCDs of the PCDS 3 perform functions that related to the security issues. As yet another example, the one or more PCDs of the PCDS 1 perform functions that are less important to support and/or grow earnings of an entity than that performed by the PCDs of the PCDS 4. As another example, the one or more PCDs of the PCDS 1 executes a lower number of applications, e.g., computer software applications, than that executed by the one or more PCDs of the PCDS 2. As still another example, the one or more PCDs of the PCDS 1 executes a number of applications for less time than that a number of applications executed by the one or more PCDs of the PCDS 3.

In one embodiment, any alternative power sources are used in place of the generator farm and the utility power supply 2. For example, each of the source interfaces 1, 2, and 3 are coupled with a generator farm or an utility power supply for providing alternative power.

In one embodiment that excludes select interfaces, a select is coupled with a connection via one connector and with another connection via another connector. For example, the select SL8 (FIG. 6D) is coupled with the connection line CL9 via a connector and the select SL8 is coupled with the connection line CL11 via a connector.

Figure 7A:
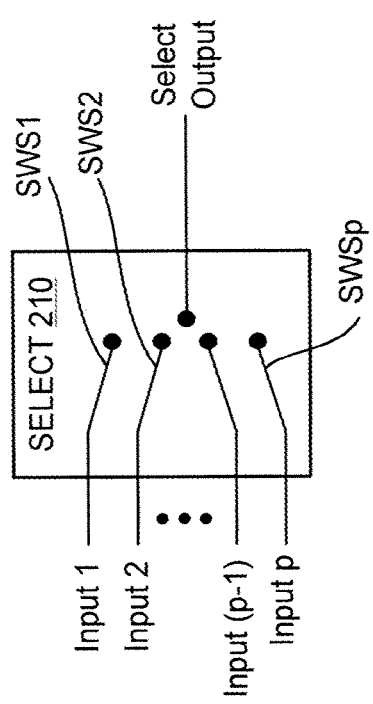
FIG. 7A is a diagram of a select as used within the MMDB of FIGS. 5A, 5B, 6A, and 6B, in accordance with an embodiment of the present invention.

FIG. 7A is a diagram of an embodiment of a select 210. The select 210 includes one or more switch systems SWS 1 thru SWS p, where p is an integer greater than zero. Each switch system SWS is coupled with an input. For example, the switch system SWS 1 is coupled to an input 1, the switch system SWS 2 is coupled to an input 2, and the switch system SWS p is coupled to an input p. A switch system includes one or more switches that are equal in number to a number of phase lines, a ground line, and a neutral line. For example, a number of switches within a switch system is equal to five when the neutral line is used. In case a neutral line is not used, a switch system includes four switches.

The select 210 is an example of any select SL1, SL2, SL3, SL4, SL5, SL11, SL12, SL13, SL14, SL15 (FIGS. 5A, 5B, 6A, and 6B). For example, when the select 210 is the select SL1 of FIG. 5A, the switch system SWS 1 is coupled with the connection line CL1 via the select interface A11, the switch system SWS 2 is coupled with the connection line CL 2 via the select interface B11, the switch system SWS 3 is coupled with the connection line CL 3 via the select interface C11, and the switch system SWS 4 is coupled with the connection line CL 4 via the select interface D11.

In one embodiment, each switch of the switch system SWS of the select 210 is operated by a controller via a driver. As used herein, a controller may be an application specific integrated circuit (ASIC), a processor, a programmable logic device (PLD), a microprocessor, or a central processing unit (CPU). Examples of a driver include a transistor, e.g., a bipolar junction transistor, field effect transistor, etc. The controller sends a signal to the driver, which drives a switch to close or open the switch. When the switch system SWS is in the open position, all switches of the switch system SWS are in the open position and when the switch system SWS is in the closed position, all switches of the switch system SWS are in the closed position.

When the switch system SWS p is in the closed position, the switch system SWS p is coupled with an output of the select 210 and when the switch system SWS p is in the open position, the switch system SWS p is not coupled with the output. For example, when the switch system SWS 1 is in the closed position, the switch system SWS 1 facilitates transfer of three phase signals, a ground signal, and a neutral signal between the connection line CL1 and the output of the select A11 (FIG. 5A). As another example, when the switch system SWS 1 is in the open position, the switch system SWS 1 does not allow transfer of three phase signals, a ground signal, and a neutral signal between the connection line CL1 and the output of the select A11.

In one embodiment, a switch system SWS is closed when a power source that is coupled to the switch system SWS is activated to provide power to a PCDS that is also coupled to the switch system SWS. For example, the switch system SWS 1 is closed when the utility power supply 1 is activated to supply main power and the closing of the switch results in supply of the main power to the PCDS 2 via the PDU 2. In this embodiment, the switch system SWS is opened when a power source that is coupled to the switch system SWS is de-activated, e.g., turned off, to remove supply of power to a PCDS that is also coupled to the switch system SWS. For example, the switch system SWS 1 is opened when the utility power supply 1 is de-activated to remove a supply of main power and the opening of the switch results in a loss of supply of the main power to the PCDS 2 via the PDU 2. In this example, the switch system SWS 2 is closed to supply alternative power from the UPS farm to the PCDS 2 via the PDU 2.

Figure 7B:
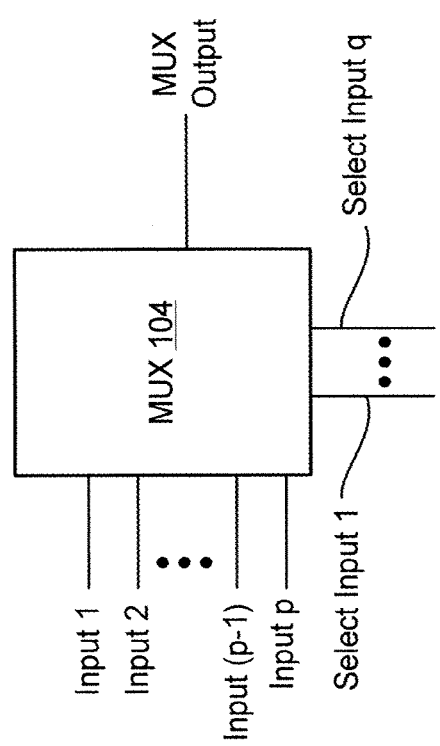
FIG. 7B is a diagram of a multiplexer that is used as a select within the MMDB of FIGS. 5A, 5B, 6A, and 6B, in accordance with one embodiment of the present invention.

FIG. 7B is a diagram of an embodiment of a multiplexer 104. The multiplexer has multiple select inputs 1 thru q, where q is an integer such that 2 to the power of q is equal to p. Each input is coupled with a connection line. For example, the input 1 of the multiplexer 104 is coupled to the connection line CL1, the input 2 is coupled to the connection line CL2, etc. Each input of the multiplexer 104 is a three phase input, e.g., the input 1 includes three phase lines, a ground line, and a neutral line. When a neutral line is not used, each input of the multiplexer 104 is a three phase input that includes three phase lines and a ground line.

The multiplexer 104 is an example of any select SL1, SL2, SL3, SL4, SL5, SL11, SL12, SL13, SL14, and SL15 (FIGS. 5A, 5B, 6A, and 6B). For example, when the a multiplexer 104 is the select SL1 of FIG. 5A, the input 1 of the multiplexer 104 is coupled with the connection line CL1 via the select interface A11, the input 1 of the multiplexer 104 is coupled with the connection line CL 2 via the select interface B11, the input 3 of the multiplexer 104 is coupled with the connection line CL 3 via the select interface C11, and the input 4 of the multiplexer 104 is coupled with the connection line CL 4 via the select interface D11.

Each select input of the multiplexer 104 is controlled by a controller. The controller sends signals to the select inputs 1 thru q to provide power signals on one of the inputs 1 thru p to the output of the multiplexer 104. In one embodiment, an input of the multiplexer 104 is coupled with the output of the multiplexer 104 when a power source that is coupled to the input is activated to provide power to a PCDS that is coupled to the output of the multiplexer 104. For example, the input 1 of the multiplexer 104 is coupled with the output of the multiplexer 104 when the utility power supply 1 is activated to supply main power and the coupling results in supply of the main power to the PCDS 2 via the PDU 2. In this embodiment, the input 1 of the multiplexer 104 is decoupled from the output of the multiplexer 104 when a power source that is coupled to the input 1 is de-activated, e.g., turned off, to remove supply of power to a PCDS that is coupled to the output of the multiplexer 104. For example, the input 1 of the multiplexer 104 is decoupled from the output of the multiplexer 104 when the utility power supply 1 is de-activated to remove a supply of main power and the decoupling results in a loss of supply of the main power to the PCDS 2 via the PDU 2. In this example, the input 1 of the multiplexer 104 is decoupled from the output of the multiplexer 104 when alternative power is supplied from the UPS farm to the PCDS 2 via the PDU 2.

Figure 7C:
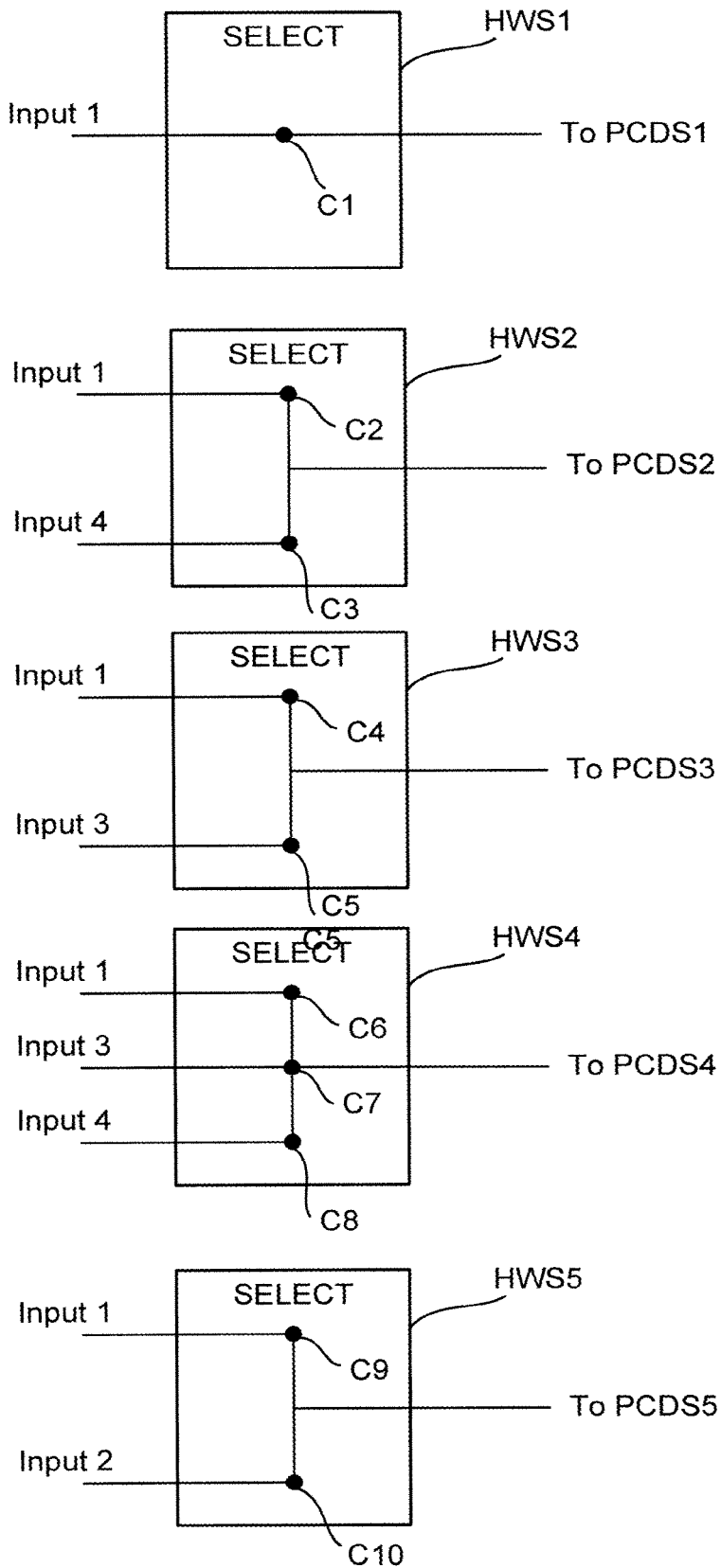
FIG. 7C is a diagram of multiple interchangeable hard-wired selects used within the MMDB of FIGS. 5C, 5D, 6C, and 6D, in accordance with an embodiment of the present invention.

FIG. 7C is a diagram of an embodiment of multiple hardwired selects HWS 1 thru HWS 5. The hardwired select HWS 1 is an example of any of the select SL6 and SL16 (FIGS. 5C, 5D, 6C, 6D). In one embodiment, the hardwired select HWS 1 includes a hardwired connection C1 that is coupled to the connection line CL 1 via the select interface A11 (FIG. 5C) or A21 (FIG. 5D) and is coupled with the PCDS 1 via the PDU 1 (FIGS. 5C and 5D). In another embodiment, the hardwired connection C1 is coupled to the connection line CL 5 via the select interface E11 (FIG. 6C) or E21 (FIG. 6D) and is coupled with the PCDS 2 via the PDU 2 (FIGS. 6C and 6D). It should be noted that the hardwired select HWS 1 lacks a connection to obtain alternative power from an alternative power supply, e.g., the utility power supply 2, the generator farm, the UPS farm, etc.

Also, the hardwired select HWS 2 is an example of the select SL7 (FIGS. 5C, 5D). In an embodiment, the hardwired select HWS 2 includes a connection C2 that is coupled to the connection line CL 5 via the select interface E11 or E21 and is coupled to the PDCS 2 via the PDU 2 (FIGS. 5C and 5D). In this embodiment, the hardwired select HWS 2 includes a connection C3 that is coupled to the connection line CL 8 via the select interface H11 or H21 and is coupled to the PCDS 2 via the PDU 2 (FIGS. 5C and 5D). It should be noted that the hardwired select HWS 2 lacks a connection to obtain alternative power from the utility power supply 2 and lacks a connection to obtain alternative power from the generator farm.

The hardwired select HWS 3 is an example of the select SL8 and SL17 (FIGS. 5C, 5D, 6C, 6D). In one embodiment, the hardwired select HWS 3 includes a connection C4 that is coupled to the connection line CL 9 via the select interface I11 or I21 and a connection C5 that is coupled to the connection line CL 11 via the select interface K11 (FIG. 5C) or K21 (FIG. 5D). In this embodiment, the connections C4 and C5 are coupled to the PDCS 3 via the PDU 3.

In an embodiment, the hardwired select HWS 3 includes the connection C4 that is coupled to the connection line CL 13 via the select interface M11 or M21 and the connection C5 that is coupled to the connection line CL 15 via the select interface O11 (FIG. 6C) or O21 (FIG. 6D). In this embodiment, the connections C4 and C5 are coupled to the PDCS 4 via the PDU 4. It should be noted that in this embodiment, the hardwired select HWS 3 lacks a connection to obtain alternative power from the utility power supply 2 and lacks a connection to obtain alternative power from the UPS farm.

The hardwired select HWS 4 is an example of the select SL9 (FIGS. 5C, 5D). In one embodiment, the hardwired select HWS 4 includes a connection C6 that is coupled to the connection line CL 13 via the select interface M11 or M21, a connection C7 that is coupled to the connection line CL 15 via the select interface O11 (FIG. 5C) or O21 (FIG. 5D), and a connection C8 that is coupled to the connection line CL 16 via the select interface P11 (FIG. 5C) or P21 (FIG. 5D). In this embodiment, the connections C4 thru C6 are coupled to the PCDS 4 via the PDU 4. It should be noted that the hardwired select HWS 4 lacks a connection to obtain alternative power from the utility power supply 2.

The hardwired select HWS 5 is an example of the select SL10 (FIGS. 5C, 5D, 6C, 6D). In one embodiment, the hardwired select HWS 5 includes a connection C9 that is coupled to the connection line CL 17 via the select interface Q11 or Q21 and a connection C10 that is coupled to the connection line CL 18 via the select interface R11 (FIG. 5C) or R21 (FIG. 5D). In this embodiment, the connections C9 and C10 are coupled to the PCDS 5 via the PDU 5. It should be noted that the hardwired select HWS 5 lacks a connection to obtain alternative power from the UPS farm and lacks a connection to obtain alternative power from the generator farm.

Figure 7D:
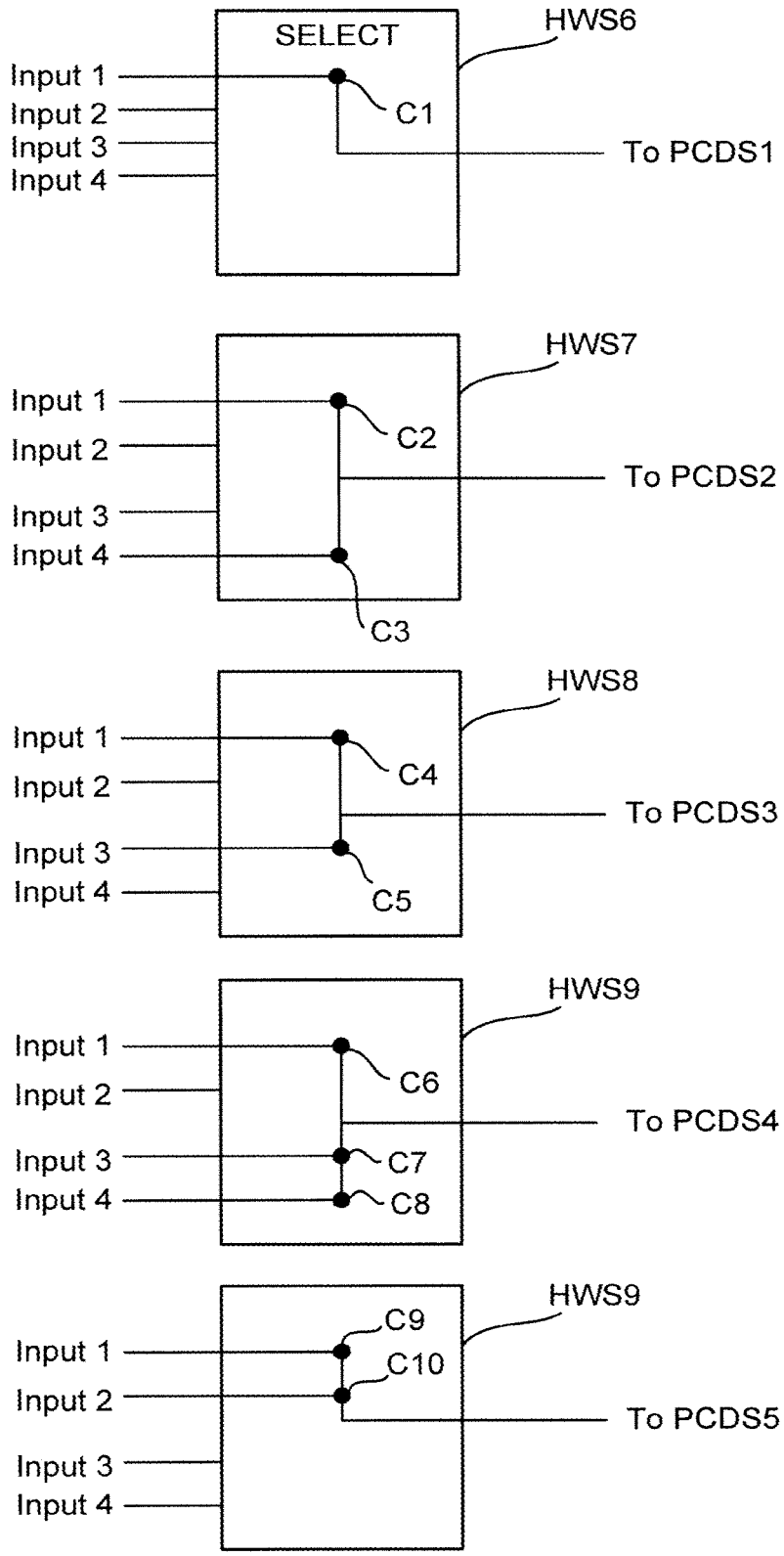
FIG. 7D is a diagram of multiple interchangeable hard-wired selects used within the MMDB of FIGS. 5A and 5B, in accordance with an embodiment of the present invention.

FIG. 7D is a diagram of an embodiment of multiple hardwired selects HWS 6 thru HWS 10. The hardwired select HWS 6 is an example of the select SL1 (FIGS. 5A and 5B). The hardwired select HWS 6 includes the hardwired connection C1 that is coupled to the connection line CL 1 via the select interface A11 or A 21 (FIGS. 5A, 5B) and is coupled with the PCDS 1 via the PDU 1 (FIGS. 5A and 5B). It should be noted that the hardwired select HWS 6 lacks a connection to transfer alternative power from an alternative power supply, e.g., the utility power supply 2, the generator farm, the UPS farm, etc. to the PCDS 1.

Also, the hardwired select HWS 7 is an example of the select SL2 (FIGS. 5A, 5B). In an embodiment, the hardwired select HWS 7 includes the connection C2 that is coupled to the connection line CL 5 via the select interface E11 or E21 and is coupled to the PDCS 2 via the PDU 2 (FIGS. 5A and 5B.) The hardwired select HWS 7 further includes the connection C3 that is coupled to the connection line CL 8 via the select interface H11 or H21 and is coupled to the PCDS 2 via the PDU 2 (FIGS. 5A and 5B). It should be noted that the hardwired select HWS 7 lacks a connection to transfer alternative power from the utility power supply 2 to the PCDS 2 and lacks a connection to transfer alternative power from the generator farm to the PCDS 2.

The hardwired select HWS 8 is an example of the select SL3 (FIGS. 5A, 5B). The hardwired select HWS 8 includes the connection C4 that is coupled to the connection line CL 9 via the select interface I11 or I21 and the connection C5 that is coupled to the connection line CL 11 via the select interface K11 or K21 (FIGS. 5A, 5B). The hardwired select HWS 8 lacks a connection to obtain alternative power from the utility power supply 2 and lacks a connection to obtain alternative power from the UPS farm.

The hardwired select HWS 9 is an example of the select SL4 (FIGS. 5A, 5B). In one embodiment, the hardwired select HWS 9 includes the connection C6 that is coupled to the connection line CL 13 via the select interface M11 or M21, the connection C7 that is coupled to the connection line CL 15 via the select interface O11 (FIG. 5A) or O21 (FIG. 5B), and the connection C8 that is coupled to the connection line CL 16 via the select interface P11 (FIG. 5A) or P21 (FIG. 5B). In this embodiment, the connections C4 thru C6 are coupled to the PDCS 4 via the PDU 4. It should be noted that the hardwired select HWS 9 lacks a connection to obtain alternative power from the utility power supply 2.

The hardwired select HWS 10 is an example of the select SL5 (FIGS. 5A, 5B). The hardwired select HWS 10 includes the connection C9 that is coupled to the connection line CL 17 via the select interface Q11 or Q21 and the connection C10 that is coupled to the connection line CL 18 via the select interface R11 (FIG. 5A) or R21 (FIG. 5B). The connections C9 and C10 are coupled to the PDCS 5 via the PDU 5. It should be noted that the hardwired select HWS 10 lacks a connection to obtain alternative power from the UPS farm and lacks a connection to obtain alternative power from the generator farm. It should be noted that in the embodiments shown in FIGS. 6A and 6B, the HWSs 6 thru 10 may be used after being modified. For example, each of HWS 6 thru 10 is used within the systems of FIGS. 6A and 6B after being modified to remove the input 4 and the connections C3 and C8 for receiving power from the UPS farm.

Figure 8:
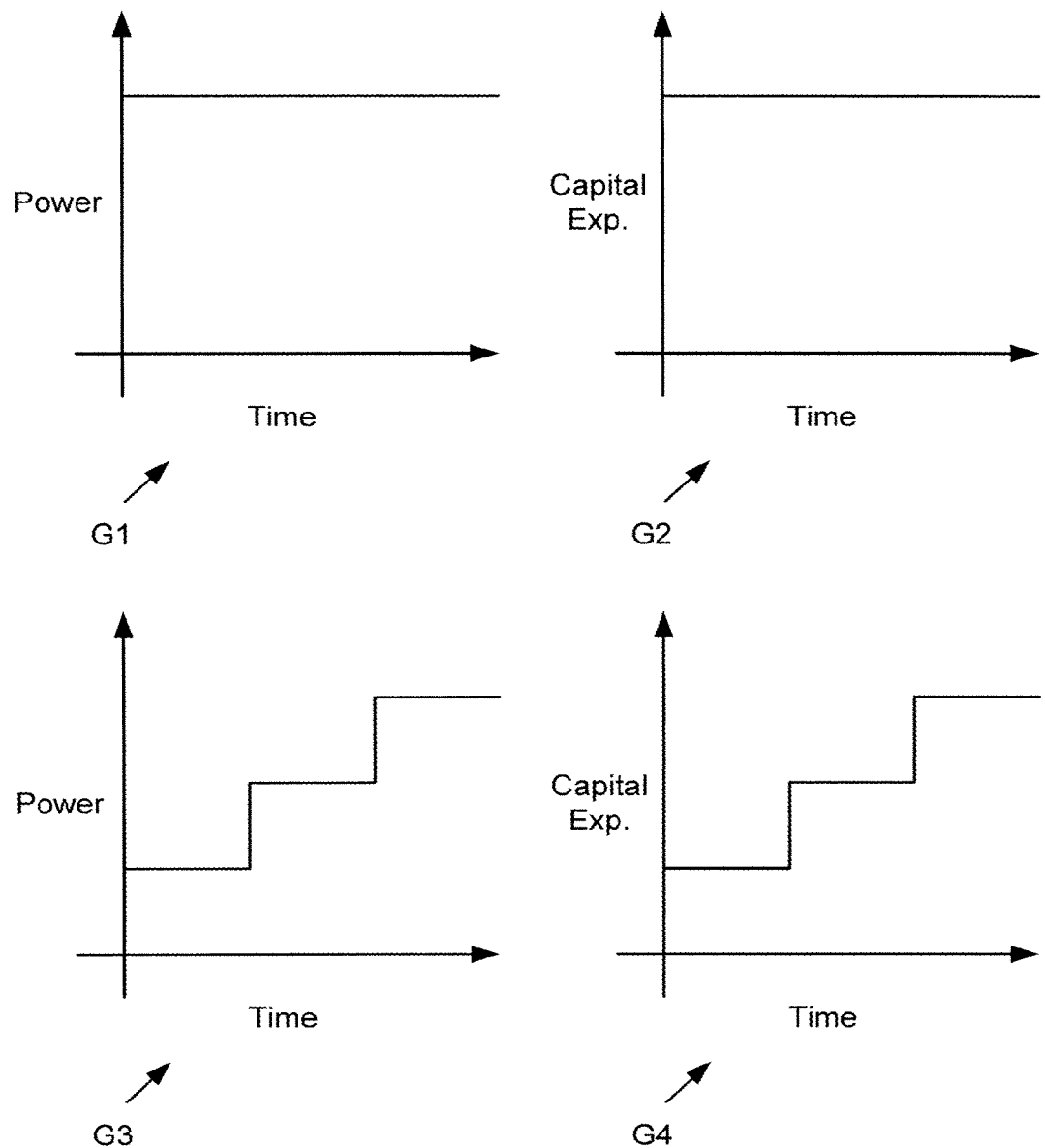
FIG. 8 shows various graphs to illustrate a comparison between use of various modes that are described above and lack of use of various modes, in accordance with an embodiment of the present invention.

FIG. 8 shows embodiments of various graphs G1 thru G4 to illustrate a comparison between use of various modes that are described above and lack of use of various modes. Graphs 1 and 3 plot a use of power sources to provide power versus time and graphs 2 and 4 plot capital expenditures incurred by an entity over time. As shown in graph 1, all power sources, e.g., utility power source 1, UPS, and generator are obtained by an entity and are used to provide power to one or more PCDSs. Graph 2 illustrates capital expenditure associated with obtaining all power sources at a time. The capital expenditure is at a maximum when all power sources are obtained and used by an entity to provide power to one or more PCDSs.

Comparatively, as shown in graph 3, a use of power sources increases with time when the various modes are used. For example, when PCDS 1 and PCDS 2 are sufficient for operation of an entity, the generator farm that is an alternative power source for the PCDS 3 is not obtained by the entity. This results in an initial savings of capital expenditures as shown in graph G4.

It should be noted that although a step function is shown in graphs G3 and G4, in an embodiment, a curve function or a sloped line function is used.

Figure 9:
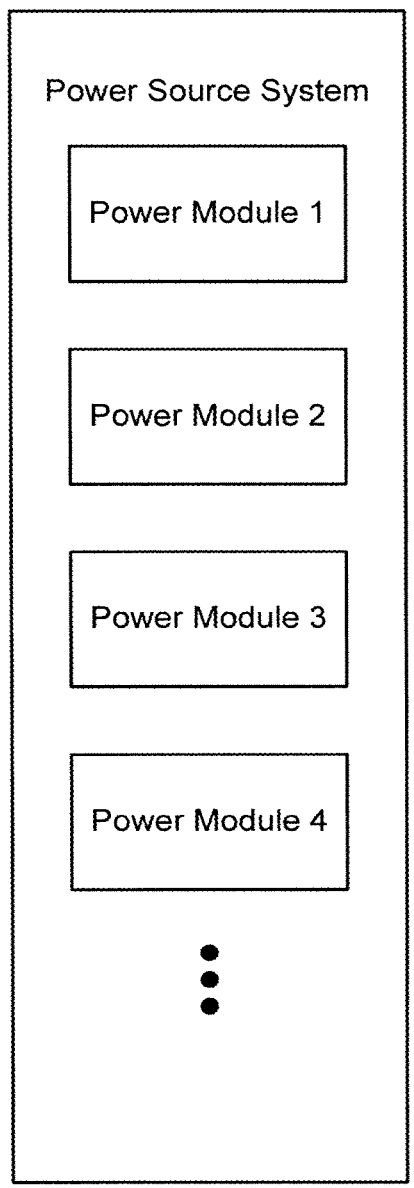
FIG. 9 is a block diagram of an embodiment of a power source system, in accordance with one embodiment of the present invention.

FIG. 9 is a block diagram of an embodiment of a power source system. The power source system is an example of the UPS farm or the generator farm. The power source system includes one or more power modules, each of which generate power. For example, the power module 1 is a generator that generates alternative power and the power module 2 is another generator that generates alternative power as well. As another example, the power module 1 is a battery that generates alternative power and the power module 2 is another battery that generates alternative power. As more power is to be generated, more power modules are added to the power source system.

It should be noted that although the above-described embodiments are described with respect to three-phase lines, in various embodiments, instead of three phase lines, a single phase line or two-phase lines are used. For example, a connection link or a connection line is a single phase line.

Although various embodiments of the present invention have been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A multimode distribution system comprising:
   a first source interface configured to be coupled to a first power source to receive power generated by the first power source;
   a second source interface configured to be coupled to a second power source to receive power generated by the second power source;
   a first connection matrix coupled to the first source interface for facilitating a transfer of power received from the first source interface;
   a second connection matrix coupled to the first source interface for facilitating a transfer of power received from the first source interface and coupled to the second source interface for facilitating a transfer of power received from the second source interface;
   a first select coupled to the first connection matrix for transferring power received via the first connection matrix to an output of the first select; and
   a second select coupled to the second connection matrix for selecting between a first connection line passing through the second connection matrix and a second connection line passing through the second connection matrix to transfer power received via the first source interface from the first power source or power received via the second source interface from the second power source to an output of the second select,
   wherein the first connection matrix includes a portion of a third connection line coupled to the first source interface and includes a portion of a fourth connection line coupled to the first select, wherein the third connection line is coupled to the fourth connection line.

2. The multimode distribution system of claim 1, further comprising:
   a third source interface configured to be coupled to a third power source to receive power generated by the third power source;
   a third connection matrix coupled to the third source interface for facilitating a transfer of power received from the third source interface;
   a third select coupled to the third connection matrix for selecting among a fifth connection line passing through the third connection matrix and a sixth connection line passing through the third connection matrix and a seventh connection line passing through the third connection matrix to transfer power received via the first source interface from the first power source or power received via the second source interface from the second power source or power received via the third source interface from the third power source to an output of the third select.

3. The multimode distribution system of claim 1, wherein the second select is configured to select the second connection line after selecting the first connection line.

4. The multimode distribution system of claim 1, wherein the first source interface is configured to convert power received from the first power source into power compatible with a load coupled to the first select and the second source interface is configured to convert power received from the second power source into power compatible with a load coupled to the second select.

5. The multimode distribution system of claim 1, wherein the second connection matrix includes a portion of the third connection line coupled to the first select interface, a portion of a fifth connection line coupled to the second power source select interface, a portion of the first connection line coupled to the second select, and a portion of the second connection line coupled to the second select, wherein the first connection line is coupled to the third connection line and the second connection line is coupled to the fifth connection line.

6. The multimode distribution system of claim 1, wherein the second select includes a multiplexer configured to select between the first and second connection lines to couple one of the first and second connection lines to the output of the second select.

7. A multimode distribution system comprising:
   a first source interface configured to be coupled to a main power source to receive power generated by the main power source;
   a second source interface configured to be coupled to an alternative power source to receive power generated by the alternative power source;
   a first connection matrix coupled to the first source interface for facilitating a transfer of power received from the first source interface;
   a second connection matrix coupled to the first source interface for facilitating a transfer of power received from the first source interface and coupled to the second source interface for facilitating a transfer of power received from the second source interface;
   a first housing including a first select coupled to the first connection matrix, the first select for transferring power received via the first connection matrix to an output of the first select; and a second housing including a second select coupled to the second connection matrix, the second select for selecting between a first connection line passing through the second connection matrix and a second connection line passing through the second connection matrix to transfer power received via the first source interface from the main power source or power received via the second source interface from the alternative power source to an output of the second select, wherein the first connection matrix includes a portion of a third connection line coupled to the first source interface and includes a portion of a fourth connection line coupled to the first select, wherein the third connection line is coupled to the fourth connection line.

8. The multimode distribution system of claim 7, further comprising:
a third source interface configured to be coupled to an additional power source to receive power generated by the additional power source;
a third connection matrix coupled to the third source interface for facilitating a transfer of power received from the third source interface;
a third select coupled to the third connection matrix for selecting among a fifth connection line passing through the third connection matrix and a sixth connection line passing through the third connection matrix and a seventh connection line passing through the third connection matrix to transfer power received via the first source interface from the main power source or power received via the second source interface from the alternative power source or power received via the third source interface from the additional power source to an output of the third select.

9. The multimode distribution system of claim 7, wherein the first source interface is configured to convert power received from the main power source into power compatible with a load coupled to the first select and the second source interface is configured to convert power received from the alternative power source into power compatible with a load coupled to the second select.

10. The multimode distribution system of claim 7, wherein the second select is configured to select the second connection line after selecting the first connection line.

11. The multimode distribution system of claim 7, wherein the second connection matrix includes a portion of the third connection line coupled to the first select interface, a portion of a fifth connection line coupled to the second select interface, a portion of the first connection line coupled to the second select, and a portion of the second connection line coupled to the second select, wherein the first connection line is coupled to the third connection line and the second connection line is coupled to the fifth connection line.

12. The multimode distribution system of claim 7, wherein the second select includes a multiplexer configured to select between the first and second connection lines to couple one of the first and second connection lines to the output of the second select.

13. A multimode distribution method comprising:
receiving, by a first source interface from a first power source, power generated by the first power source;
receiving, by a second source interface from a second power source, power generated by the second power source;
facilitating, by a first connection matrix, a transfer of power received from the first source interface to a first select;
facilitating, by a second connection matrix, a transfer of power received from the first source interface to a second select and a transfer of power received from the second source interface to the second select;
transferring, by the first select, power received via the first connection matrix to an output of the first select; and
selecting, by the second select, between a first connection line passing through the second connection matrix and a second connection line passing through the second connection matrix to transfer power received via the first source interface from the first power source or power received via the second source interface from the second power source to an output of the second select,
wherein facilitating the transfer of power received from the first source interface to the first select comprises transferring power received from the first source interface via a third connection line associated with the first connection matrix and a fourth connection line associated with the first connection matrix to the first select, wherein the fourth connection line is connected to the third connection line.

14. The method of claim 13, further comprising:
receiving, by a third source interface, power generated by a third power source;
facilitating, via a third connection matrix, a transfer of power received from the third source interface; and
selecting, by a third select, among a fifth connection line passing through the third connection matrix and a sixth connection line passing through the third connection matrix and a seventh connection line passing through the third connection matrix to transfer power received via the first source interface from the first power source or power received via the second source interface from the second power source or power received via the third source interface from the third power source to an output of the third select.

15. The method of claim 13, wherein selecting between the first connection line passing through the second connection matrix and the second connection line passing through the second connection matrix comprises selecting the second connection line after selecting the first connection line.

16. The method of claim 13, wherein facilitating the transfer of power received from the first source interface to the second select and the transfer of power received from the second source interface to the second select comprises:
transferring power received from the first source interface via the third connection line associated with the first connection matrix and the first connection line associated with the second connection matrix to an input of the second select; and
transferring power received from the second source interface via a fifth connection line associated with the second connection matrix and the second connection line to an input of the second select.

17. The method of claim 13, further comprising:
converting by the first source interface power received from the first power source into power compatible with a load coupled to the first select; and
converting by the second source interface power received from the second power source into power compatible with a load coupled to the second select.

* * * * *